United States Patent [19]

Kowno et al.

[11] Patent Number: 5,917,545
[45] Date of Patent: Jun. 29, 1999

[54] ELECTRONIC STILL CAMERA THAT CAN BE DIRECTLY INSERTED IN AN EXTERNAL DEVICE

[75] Inventors: Yousuke Kowno; Osamu Ikeda, both of Yokohama; Koichi Higashi, Machida; Koichiro Kawamura, Ichihara, all of Japan

[73] Assignee: Nikon Corporation, Tokyo, Japan

[21] Appl. No.: 08/703,745

[22] Filed: Aug. 27, 1996

[30] Foreign Application Priority Data

Aug. 31, 1995 [JP] Japan ................................. 7-223139
Aug. 31, 1995 [JP] Japan ................................. 7-224246

[51] Int. Cl.$^6$ .................................................. H04N 5/225
[52] U.S. Cl. ........................ 348/231; 348/373; 348/552; 348/372
[58] Field of Search ..................... 348/237, 233, 348/373, 374, 375, 552, 362, 372; 396/176; 354/155, 263, 287, 300, 301, 303, 348, 373, 374, 429, 535, 539, 540, 541, 544, 537

[56] References Cited

U.S. PATENT DOCUMENTS

| 4,640,598 | 2/1987 | Yoshida | 326/388 |
| 4,896,176 | 1/1990 | Barrett | 396/377 |
| 5,041,852 | 8/1991 | Misawa | 396/55 |
| 5,200,863 | 4/1993 | Orii | 360/35.1 |
| 5,438,359 | 8/1995 | Aoki | 348/552 |
| 5,475,441 | 12/1995 | Parulski | 348/552 |
| 5,488,433 | 1/1996 | Washino | 348/722 |
| 5,528,293 | 6/1996 | Watanabe | 348/231 |
| 5,644,410 | 7/1997 | Suzuki et al. . | |
| 5,708,853 | 1/1998 | Sanemitsu . | |

FOREIGN PATENT DOCUMENTS

| 63-272289 | 11/1988 | Japan . | |
| 4295886 | 10/1992 | Japan | G06G 3/00 |
| 7-274108 | 10/1995 | Japan . | |
| 2289555 | 11/1995 | United Kingdom | G06F 3/00 |

Primary Examiner—Wendy Garber

[57] ABSTRACT

A compact, light-weight electronic still camera that is thin and inexpensive to manufacture, and that can be insertably connected directly into a PC card slot of an external device. The electronic still camera is capable of accepting attachment of a cover member or a camera accessory for assisting the camera function. The electronic still camera includes a camera body, having a slot fitting portion which can be inserted into the PC card slot, or a card-shaped recording medium of the external device. A PC card connector is provided on the slot fitting portion, for connection with an internal connector of the slot upon insertion of the slot fitting portion thereinto. A camera accessory, having a connector for connection with the connector, is so formed as to be mountable on the camera body. The camera body is provided with a phototaking lens, an image pickup device, a memory device for the image signal, switches and a battery. The camera accessory is provided with a second battery and second memory devices.

19 Claims, 29 Drawing Sheets

FIG. 10
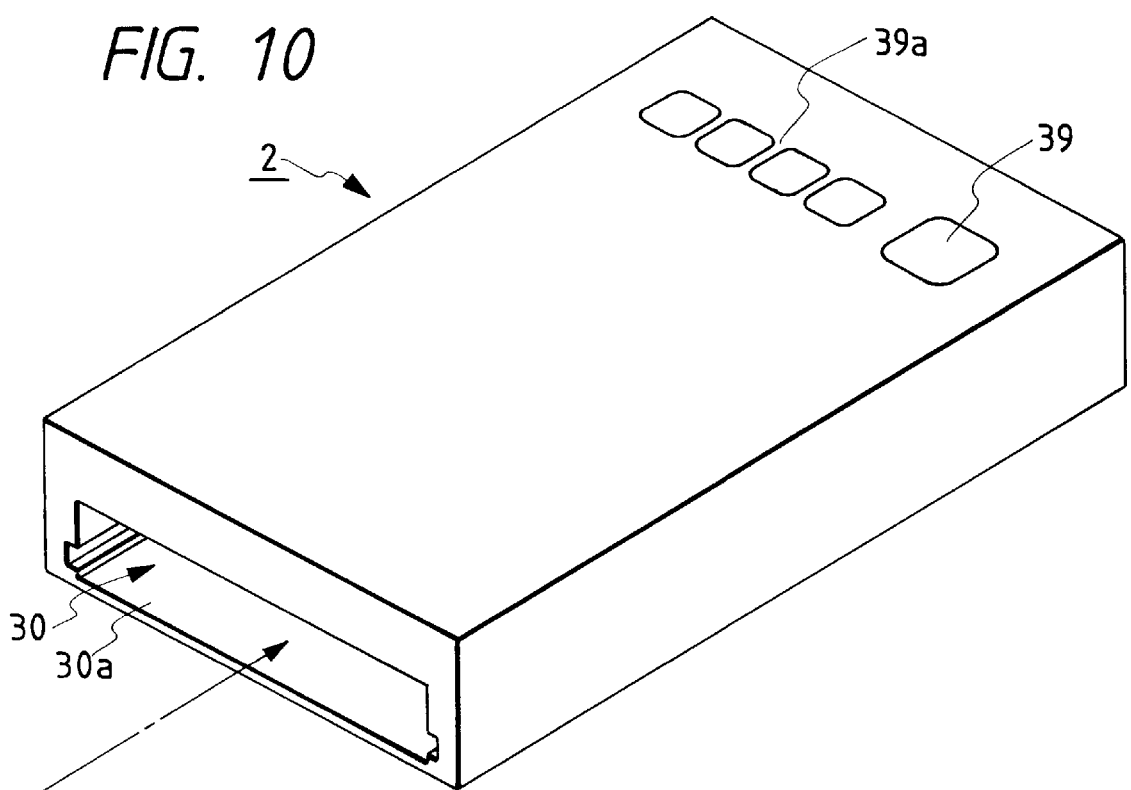
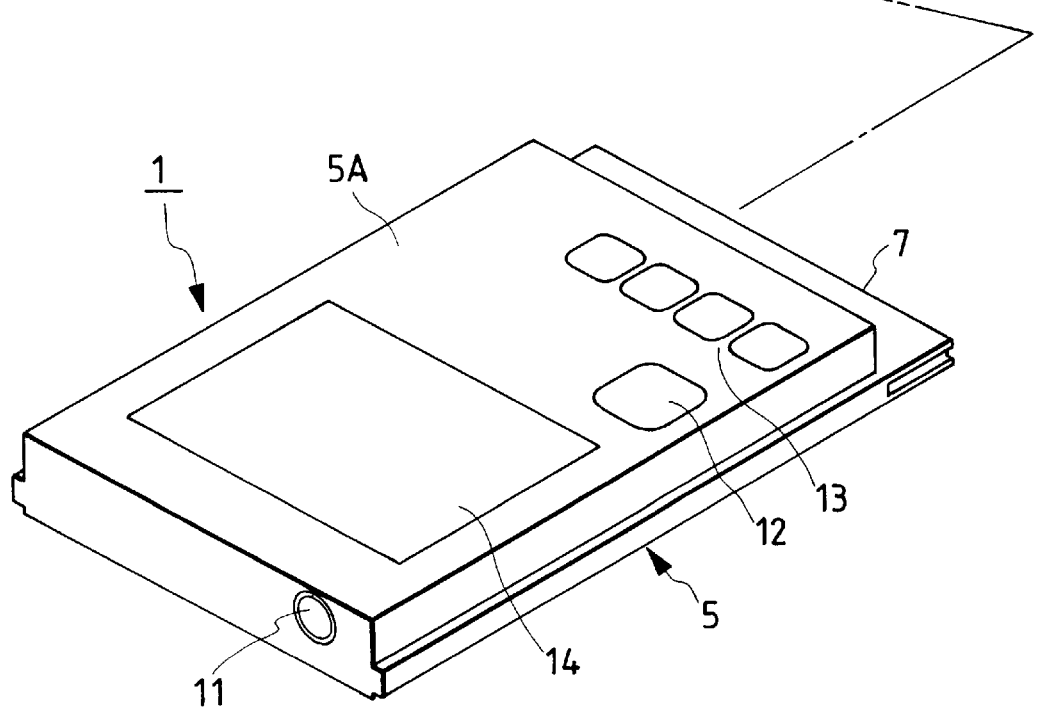

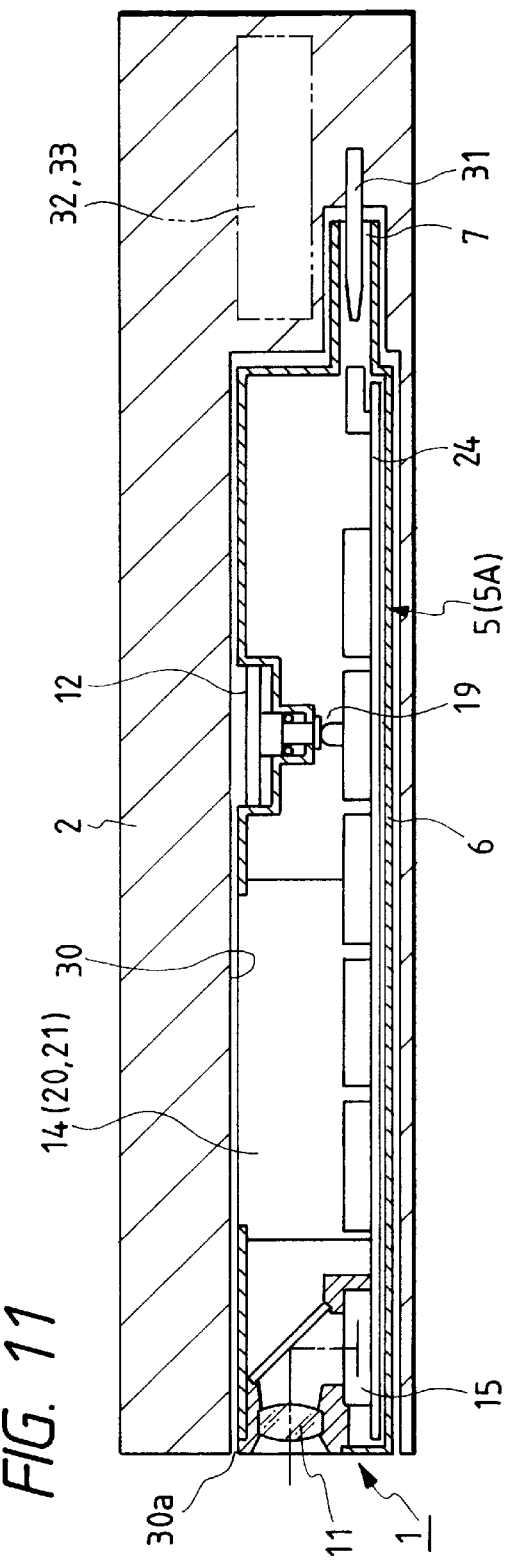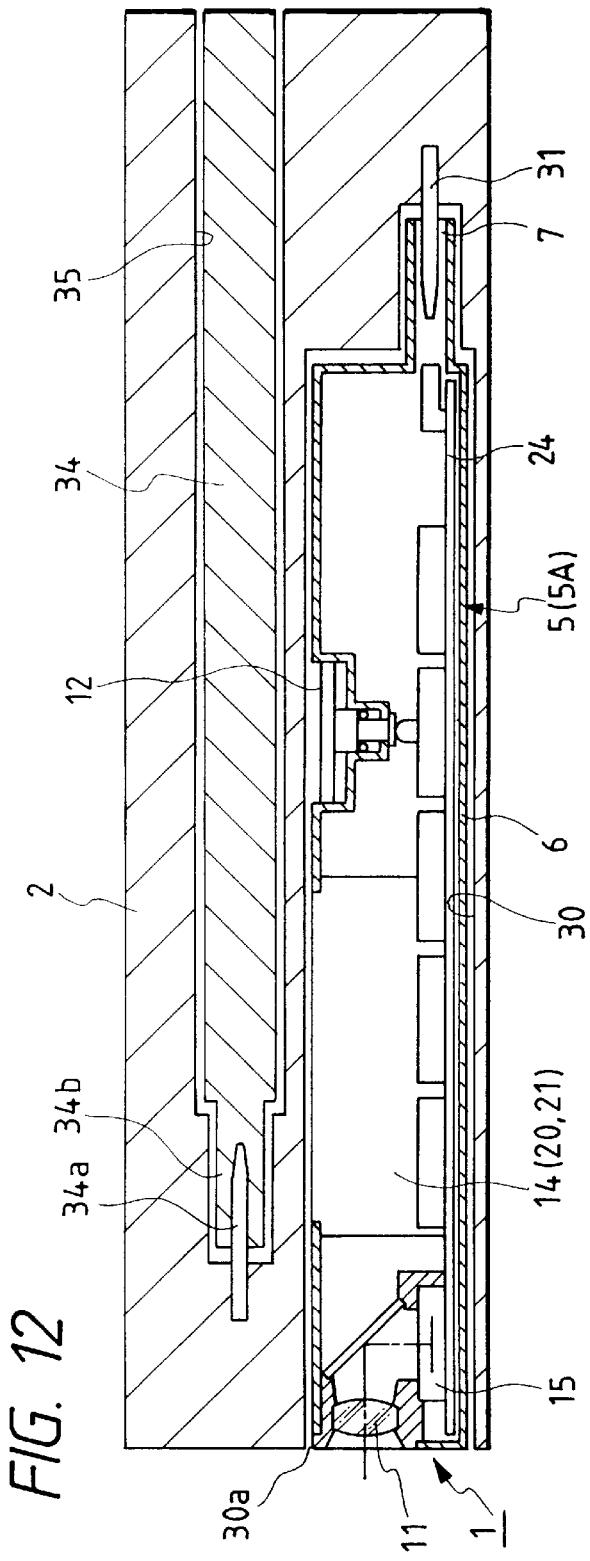

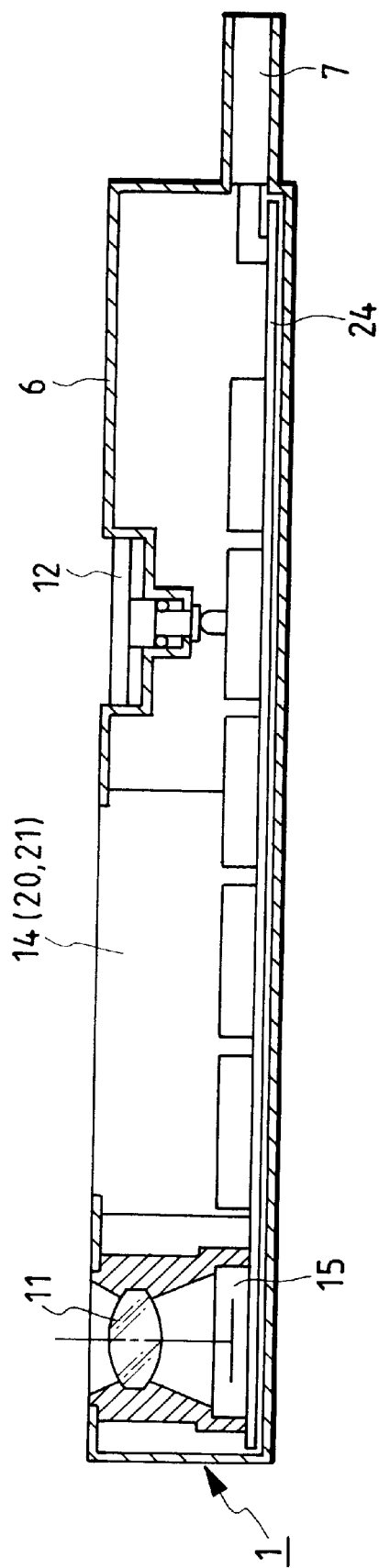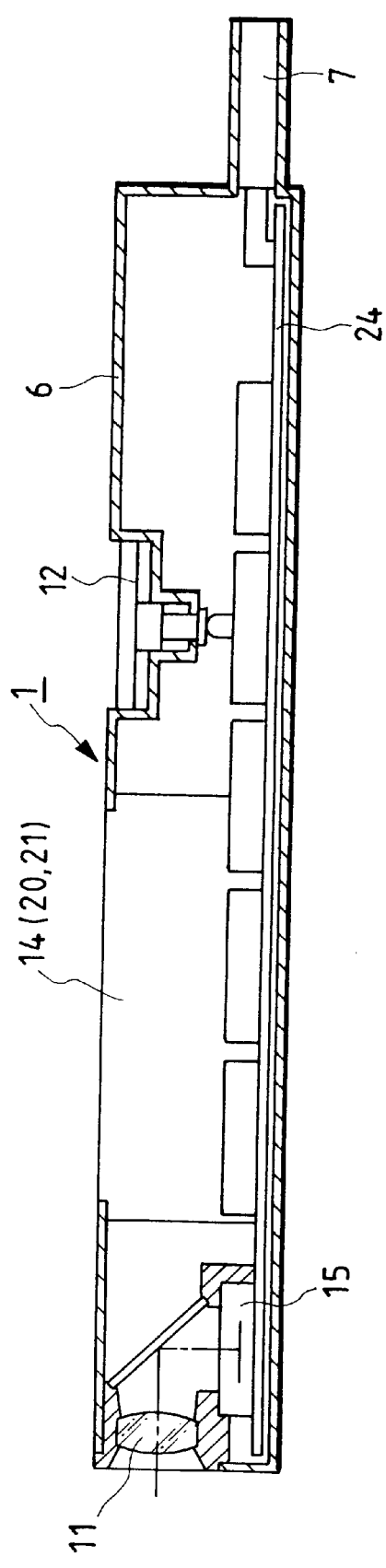

FIG. 17
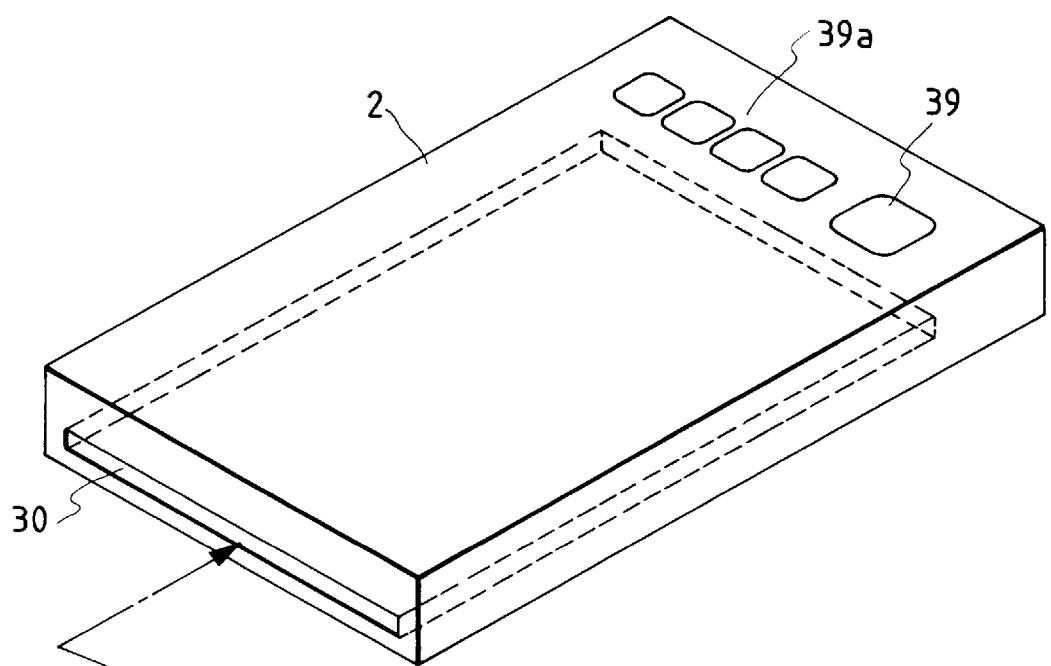
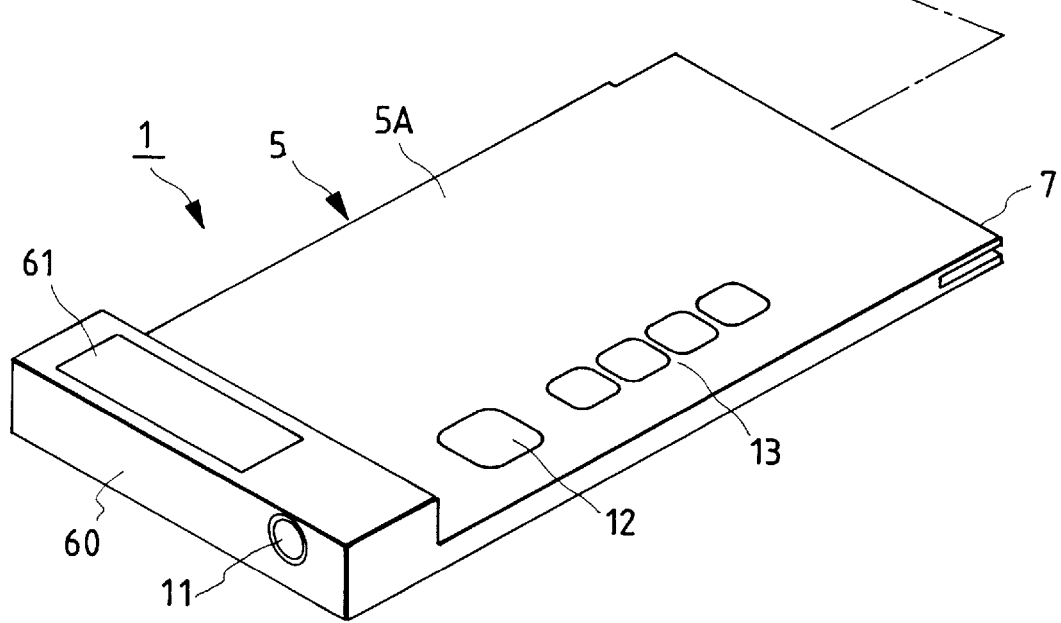

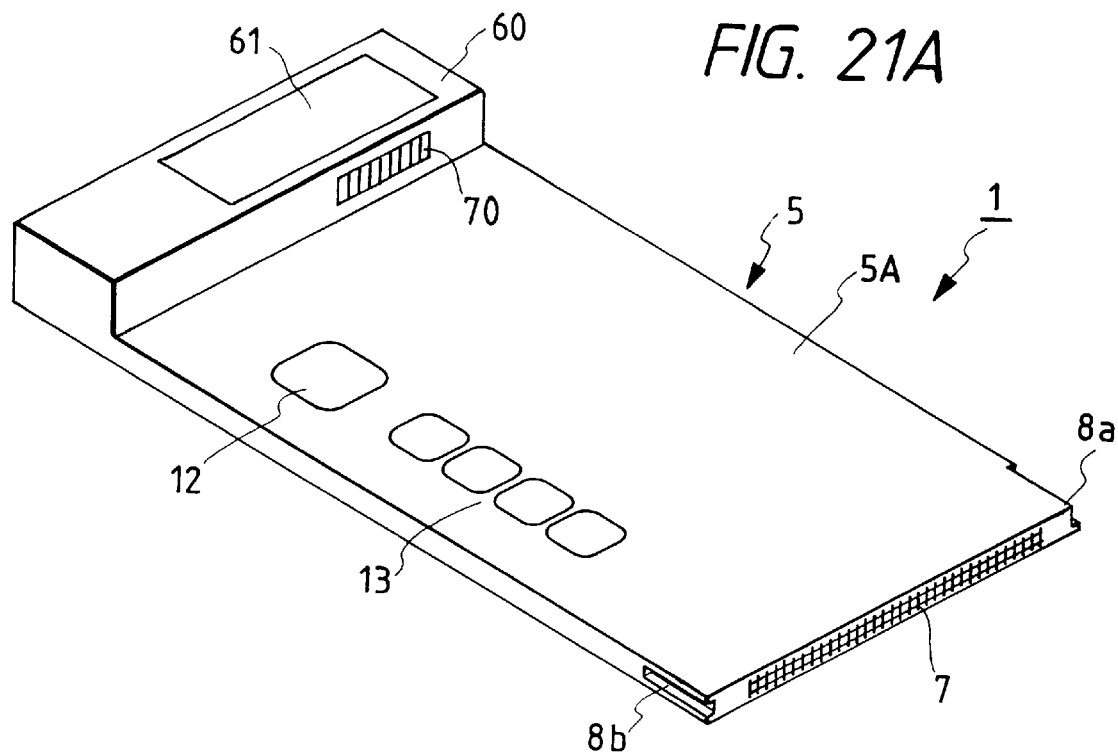
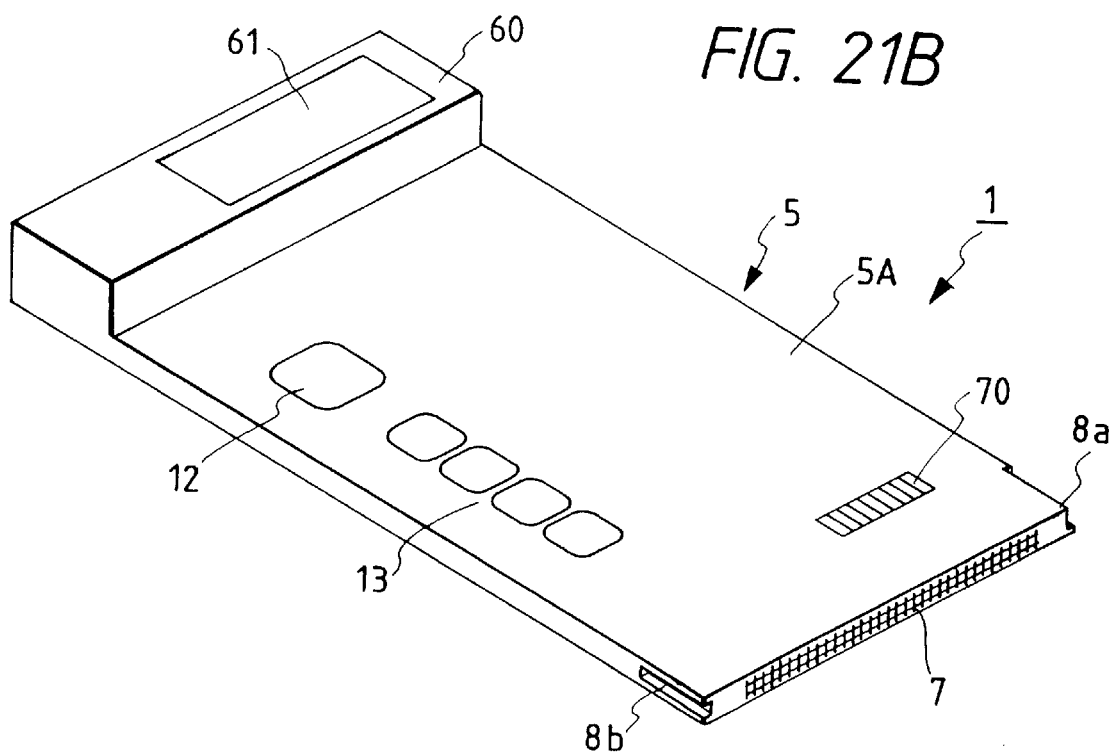

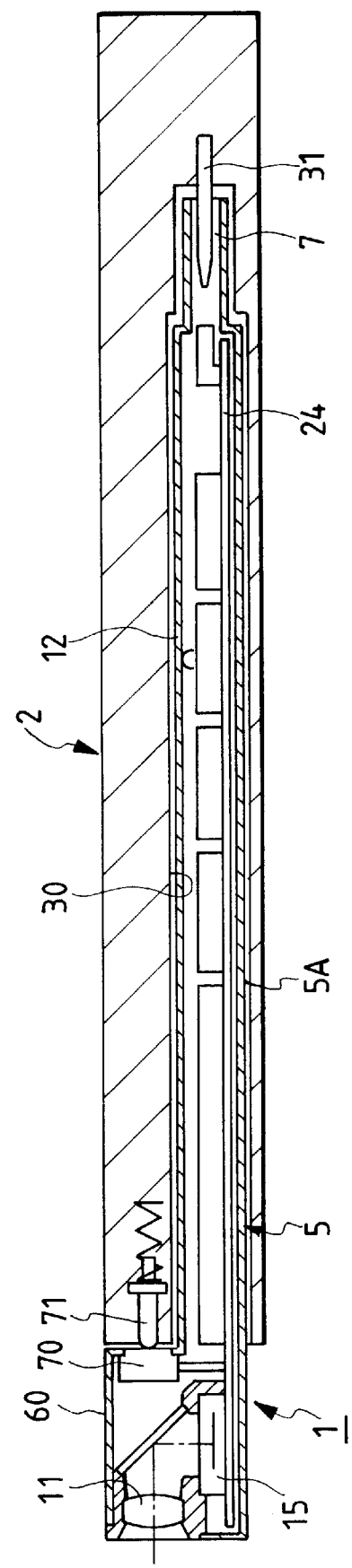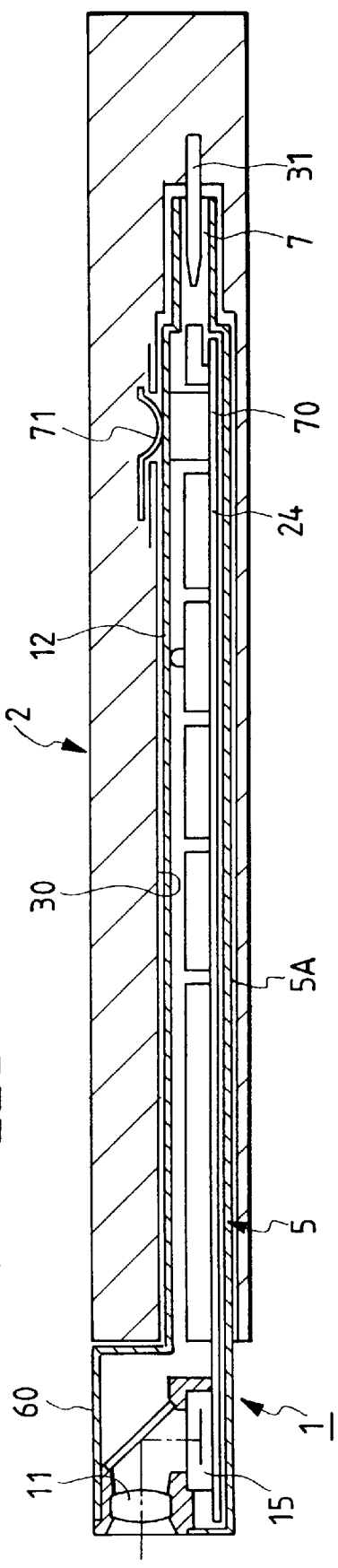

FIG. 24
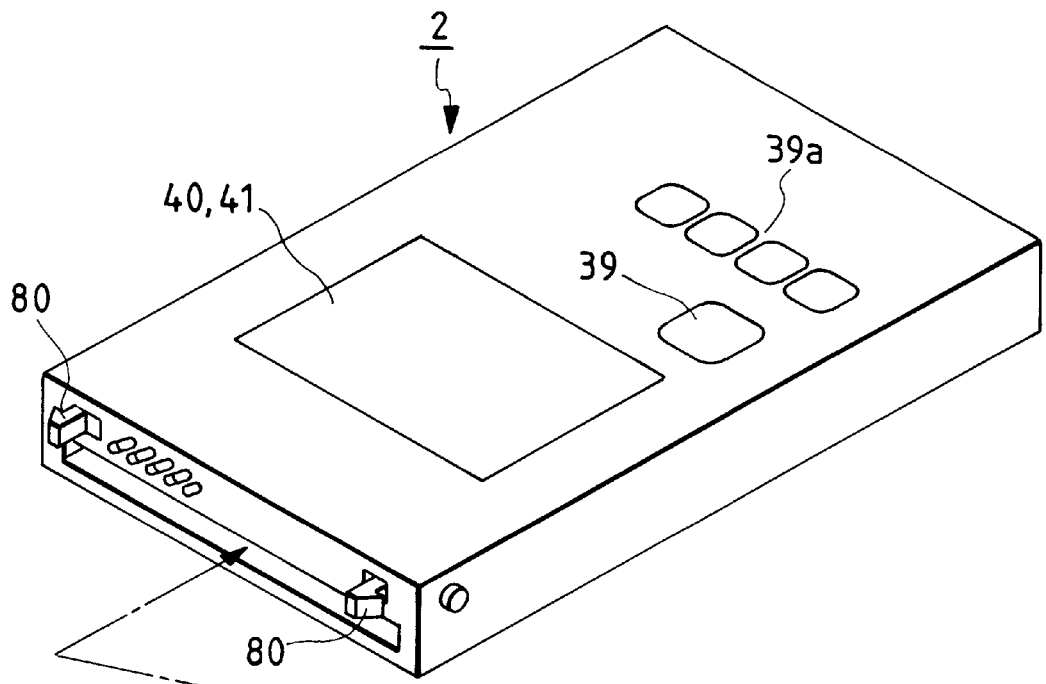
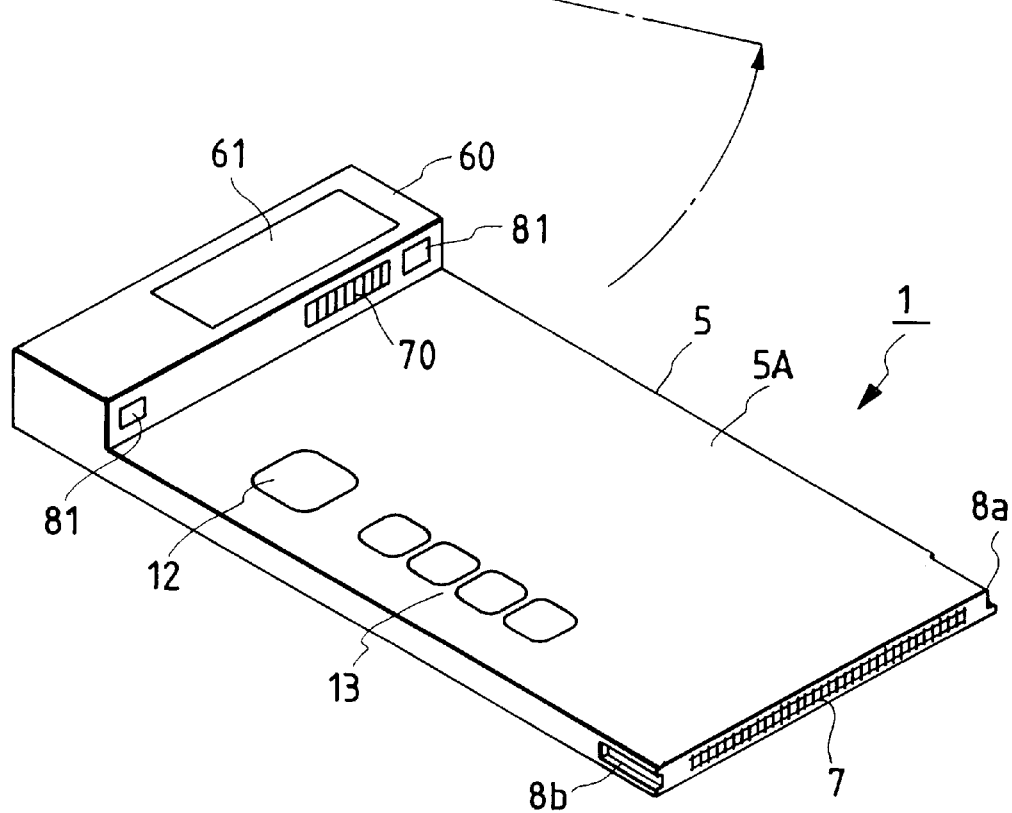

FIG. 25
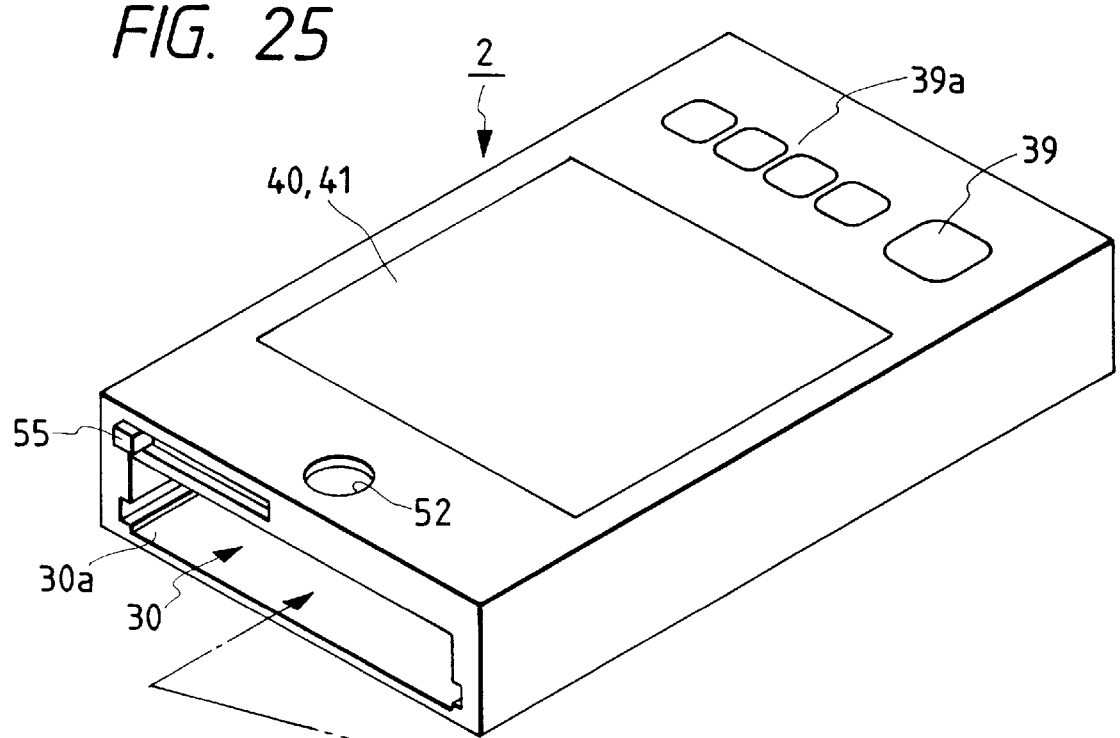
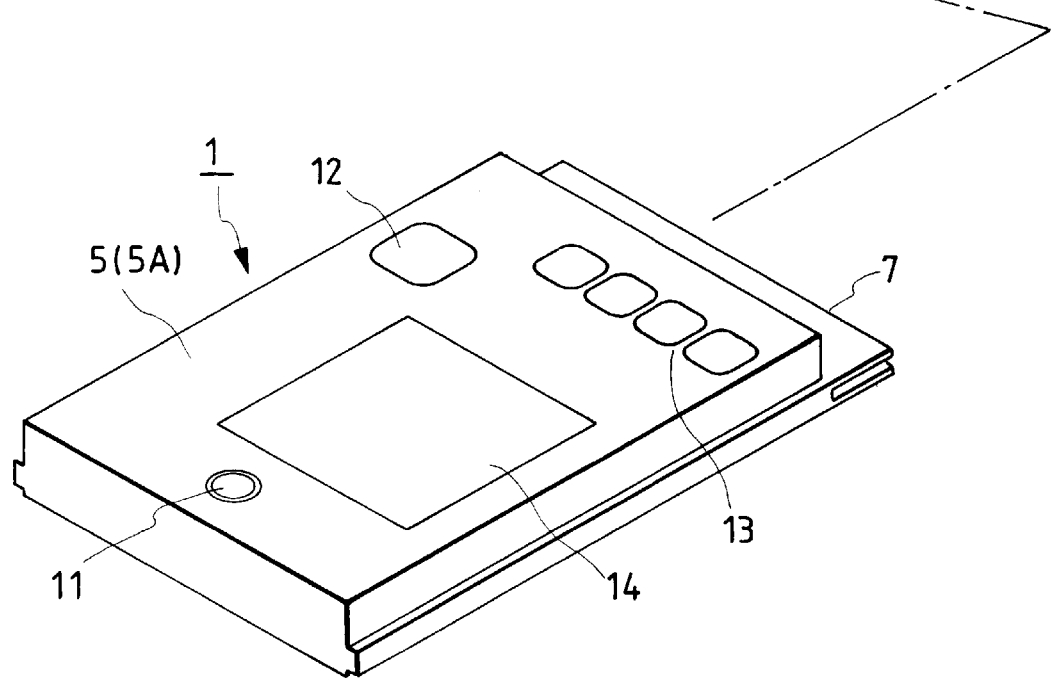

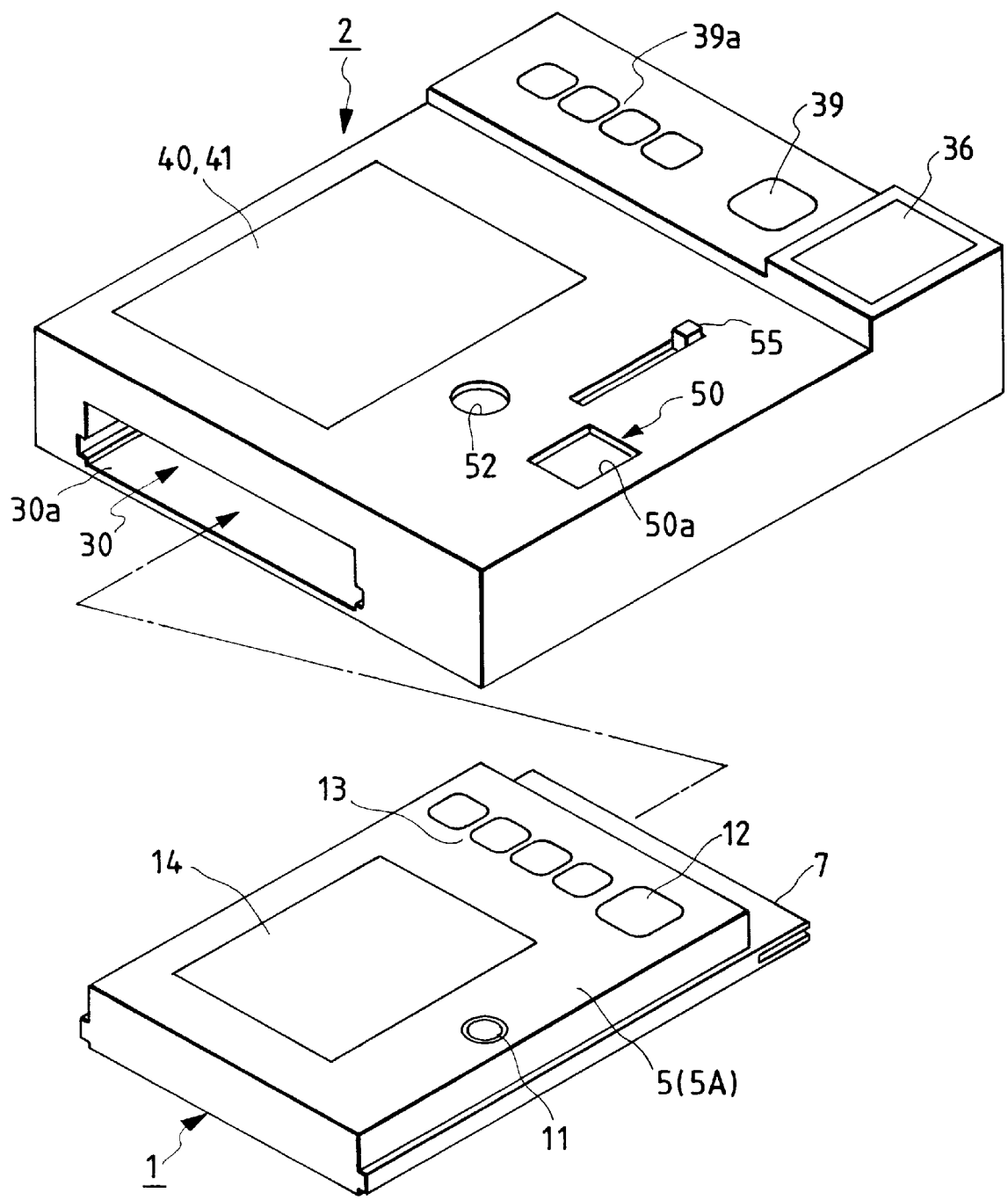

ELECTRONIC STILL CAMERA THAT CAN BE DIRECTLY INSERTED IN AN EXTERNAL DEVICE

BACKGROUND OF THE INVENTION

1. Field of the Invention

The present invention relates to an electronic still camera which is provided with a memory device for storing an image taken with an image pickup device and which can be directly mounted in a card-shaped recording medium slot provided in an external device such as a personal computer and more particularly the present invention relates to an electronic still camera allowing attachment of camera accessories for selectively providing an expansion battery, an expansion memory, a liquid crystal display panel, a flash device and the like.

2. Related Background Art

There is already known an electronic still camera, capable of converting an object image, taken with an image pickup device, into digital signals and storing them in a memory medium such as a flexible disk or a memory card.

In such conventional electronic still camera, the image signals stored in the memory medium are transferred to an external equipment, such as a personal computer ("PC"), by extracting the memory medium, storing the photographed image, from the camera after the phototaking operation, and inserting the stored image into a PC card slot of the personal computer. Image signals may also be transferred by connecting the electronic still camera with the personal computer with a communication interface such as RS-232C.

Such a conventional electronic still camera has therefore been associated with a drawback of requiring cumbersome operations in making connection with the personal computer, such as extracting the memory medium from the camera and inserting it again in the PC card slot of the personal computer, or connecting the electronic still camera and the personal computer with a communication cable.

Particularly, when the electronic still camera is connected to the personal computer with the communication cable, the computer has to be provided therein with an exclusive driver software for the data reception, and an exclusive cable for this purpose has to be prepared. Such increase in the component parts is inconvenient for storage, and the cable connecting operation is rather tedious even for a person who is skilled in handling the electronic equipment.

Also, in the electronic still camera utilizing a PC card as the memory medium, the camera itself becomes bulky because of presence of components required for the electronic still camera, other than the memory and he connector. The camera inevitably becomes expensive because of the various functions provided by such components.

For this reason, it is necessary to construct the electronic still camera as compact, light-weight, thin and inexpensive as possible, and to transfer the signals of the photographed image by mounting the electronic still camera directly in the PC card slot of the external device.

In a configuration of the electronic still camera meeting the above-mentioned requirements, where the component parts constituting the camera are reduced to a minimum, it is desirable to provide other components as accessories for the camera.

Such camera accessories include, for example, a battery pack containing a battery, a memory pack containing a memory device, a flash emission unit of an electronic flash device, usually called a strobe light, a remote control terminal for various remote operations, a view finder device, a lens adapter such as a lens filter, an externally attached conversion lens or a light regulating lens, a modem, and a liquid crystal display unit used for displaying an object field as a view finder, for displaying a recorded image for the purpose of confirmation or reproduction, and for displaying other necessary data such as the status of phototaking conditions, and the remaining capacity of the battery or the memory device.

SUMMARY OF THE INVENTION

In consideration of the foregoing, an object of the present invention is to provide an electronic still camera which can be manufactured in a compact, light-weight, thin and inexpensive manner, of which main body can be directly inserted in a PC card slot of an external device, which can also protect a PC card connector constituting a connecting unit of the camera body with the external equipment, and which enables stable holding operation during the phototaking operation.

Another object of the present invention is to provide an electronic still camera which enables easy connection with the external device by a simple operation of directly inserting the camera body into the PC card slot of the external device, which also allows easy phototaking operations and which can be further coupled with various camera accessories for supplementing the function of the camera.

The foregoing objects can be attained, according to the present invention, by an electronic still camera including a camera body having a PC card slot fitting portion insertable into a PC card slot of the external equipment; the above-mentioned PC card slot fitting portion of the camera body can be detachably inserted into a cover member. The camera body includes an image pickup device for converting the optical information from an object into an electrical signal, a memory device for storing the output signal of the image pickup device, interface means for effecting communication between the PC card interface of the external device and the above-mentioned memory device, upon being inserted into the PC card slot of the external device, and a PC card connector for connection with the connector of the PC card slot.

The present invention is also featured by a fact that the cover member comprises a shutter release button, a power source and a connector to be connected to the PC card connector of the camera body.

The present invention is further featured by a fact that the cover member comprises an electronic flash device and a control circuit therefor.

The present invention is further featured by a fact that the cover member comprises a gripping portion.

According to the present invention, there is also provided an electronic still camera comprising a camera body provided with a PC card slot fitting portion insertable into the PC card slot of an external device. The camera body includes an image pickup device for converting the optical information from an object into an electrical signal, a memory device for storing the output signal of the image pickup device, a PC card interface circuit for ffecting communication with the PC card interface of the external device and the memory device, upon being inserted into the PC card slot of the external equipment, and a PC card connector for connection with the connector of the PC card. A battery case incorporating a power source is detachably connected to the PC card connector.

The present invention is further featured by the presence of a mask member for covering the image pickup face.

According to the present invention, the PC card slot fitting portion of the camera body is inserted into the cover member for protecting such PC card slot fitting portion and for facilitating the holding of the camera body. By extracting the camera body from the cover member and inserting the PC card slot fitting portion of the camera body into the PC card slot of the personal computer or an external device, such as a PC card drive device, connected to the personal computer, communication between the memory device and the PC card interface of the external equipment is executed. The image signal stored in the memory device can be read from the external equipment.

A flash device incorporated in the cover member emits light to enable flash phototaking operation in a dark place.

Also a grip portion of the cover member enables secure holding of the camera body during the phototaking operation. Also a battery case protects the PC card connector.

Also a mask member allows the image pickup face to be varied.

According to another embodiment of the present invention, there is provided an electronic still camera comprising a camera body provided with a slot fitting portion mountable in the PC card slot (slot for card-shaped recording medium) of the external device. The slot fitting portion is provided with a connector of the PC card side for connecting with a connector of the PC card slot side when the slot fitting portion is inserted into such PC card slot. The slot fitting portion is so constructed as to be fitted with a camera accessory having a connector for connection with the connector of the PC card side.

The above-mentioned electronic still camera of the present invention is provided, in the camera body thereof, with an optical system unit including a phototaking lens facing an object and an image pickup device for converting the information, obtained from the object through the phototaking lens, into an electrical signal, a signal processing unit for converting the output signal of the image pickup device into an image signal, a memory device for storing the image signal released from the signal processing unit, switch means for turning on or off the image pickup device and the signal processing unit, and a battery for power supply to the image pickup device, the signal processing unit and the memory device.

Also the electronic still camera of the present invention is provided, in a camera accessory thereof, with a second battery for power supply to the image pickup device and the signal processing unit provided in the camera body, wherein the second battery is used preferentially when the camera accessory is mounted on the camera body.

Further according to the present invention, the camera accessory is provided with a second memory device for storing the image signal released from the signal processing unit. The camera accessory is constructed so that when the camera accessory is mounted on the camera body, either the memory device of the camera body or the second memory device is preferentially used. The storage of the image signal in the first and second memory devices is either selected in an arbitrary manner or is executed with the second or first memory respectively if the size of the image signal to be stored is large or small.

Furthermore, the electronic still camera of the present invention is provided, in the slot fitting portion of the camera body, with a connector of the card-shaped recording medium side for making connection with a matching connector of the memory medium slot side when the slot fitting portion is inserted into the recording medium slot of the external device. The electronic still camera is further provided with a second connector in another or an adjacent position of the slot fitting portion, and is provided, in the camera accessory, with a matching second connector for connecting with the above-mentioned second connector.

When the camera accessory is mounted on the camera body, the first matching connector is used for connecting the signals relating to the memory control for the image, and the second matching connector is used for connecting the signals relating to the phototaking operation of the camera.

Furthermore, the camera accessory of the electronic still camera of the present invention is provided selectively with a shutter release button, a display panel, an electronic flash device and an optical view finder device, to be used when the camera accessory is mounted on the camera body. The camera accessory is entirely formed to have an approximately rectangular thin box shape, and is provided with an insertion aperture, in which the slot fitting portion of the camera body is inserted for mounting the camera body on the camera accessory.

According to the present invention, the camera body having the slot fitting portion, mountable in the PC card slot of the external equipment, is provided with an optical system unit having a phototaking lens and an image pickup device for converting the optical information from an object into an electrical signal, a memory device for storing the image signal obtained from the output signal of the image pickup device, a connector of the PC card side for making connection with the connector of the PC card slot of the external equipment, and a battery for power supply.

According to the present invention, the camera body or a part thereof is so formed with a shape of the PC card which is a card-shaped recording medium as to be provided with a slot fitting portion that is directly insertable in the PC card slot of the personal computer or the like, whereby the camera is singly capable of the phototaking operation and can exchange the image signal with the external equipment by direct insertion of the slot fitting portion into the PC card slot of the personal computer or of an external device such as the PC card drive device connected to the personal computer. Also the camera accessory may be attached, when required, to execute the phototaking operation, the reproduction of the photographed image or the signal exchange.

Also according to the present invention, the above-explained electronic still camera can be selectively combined, by means of the slot fitting portion thereof, with camera accessories having various functions, thereby fully exploiting the functions of the camera.

Such camera accessories include, for example, a battery pack such as a main battery or an expansion battery, a memory pack containing a main or expansion memory device, a flash emission unit of an electronic flash device generally called strobe light, a remote control terminal for various remote operations, a view finder device, a lens adapter such as a lens filter, an externally attached conversion lens or a light regulating lens, a modem, and a liquid crystal display device for displaying the object field as a view finder, displaying the recorded image for the purpose of confirmation or reproduction, and displaying various data such as the conditions of phototaking operation, the remaining capacity of the battery or the memory device. The camera accessory may be further provided with a simplified view finder, and with a portion serving as a grip for holding the camera at the phototaking operation. The attachment of such camera accessory allows to realize an electronic still camera that is composed of necessary minimum number of components and is compact, light-weight, thin and inexpensive, thereby providing an equipment matching the requirements of multimedia.

The external equipment mentioned above is a personal computer or a PC card drive device attached to the personal computer, and the slot for the card-shaped recording medium is a PC card slot provided in such external equipment. The card-shaped recording medium is a so-called PC card which can for example be a memory card, an interface card, a modem card etc. that is utilized by insertion into the above-mentioned PC card slot.

The process in the signal processing unit for converting the output signal of the image pickup device into the image signal need not necessarily be executed in digital form but can also be conducted in analog manner. Also the image signal released from the signal processing unit and stored in the memory device is not limited to a digital signal but can also be an analog signal.

BRIEF DESCRIPTION OF THE DRAWINGS

FIG. 10 is an exploded perspective view of an embodiment of the electronic still camera of the present invention;

FIG. 11 is a schematic cross-sectional view of the electronic still camera shown in FIG. 10, in a combined state with the camera accessory;

FIG. 12 is a schematic cross-sectional view showing a variation of the electronic still camera shown in FIG. 11;

FIGS. 15A and 15B are cross-sectional views, showing two different structures, of the camera body of the electronic still camera shown in FIGS. 14A and 14B;

FIG. 17 is an exploded perspective view corresponding to FIG. 10 and showing the relationship between the electronic still camera and the camera accessory of the present invention;

FIGS. 21A and 21B are perspective views, seen from diagonally above, of still another embodiment of the electronic still camera of the present invention;

FIGS. 22A and 22B are schematic cross-sectional views of the electronic still camera shown in FIGS. 21A and 21B, in a combined state with the camera accessory;

FIG. 24 is an exploded perspective view of another embodiment of the electronic still camera of the present invention, showing the relationship thereof with the camera accessory;

FIG. 25 is an exploded perspective view of still another embodiment of the electronic still camera of the present invention, showing the relationship thereof with the camera accessory;

FIG. 27 is an exploded perspective view of still another embodiment of the electronic still camera of the present invention, showing the relationship thereof with the camera accessory;

DESCRIPTION OF THE PREFERRED EMBODIMENTS

[First embodiment]

In the following there will be explained a first embodiment of the present invention, with reference to the attached drawings.

Figure 1:
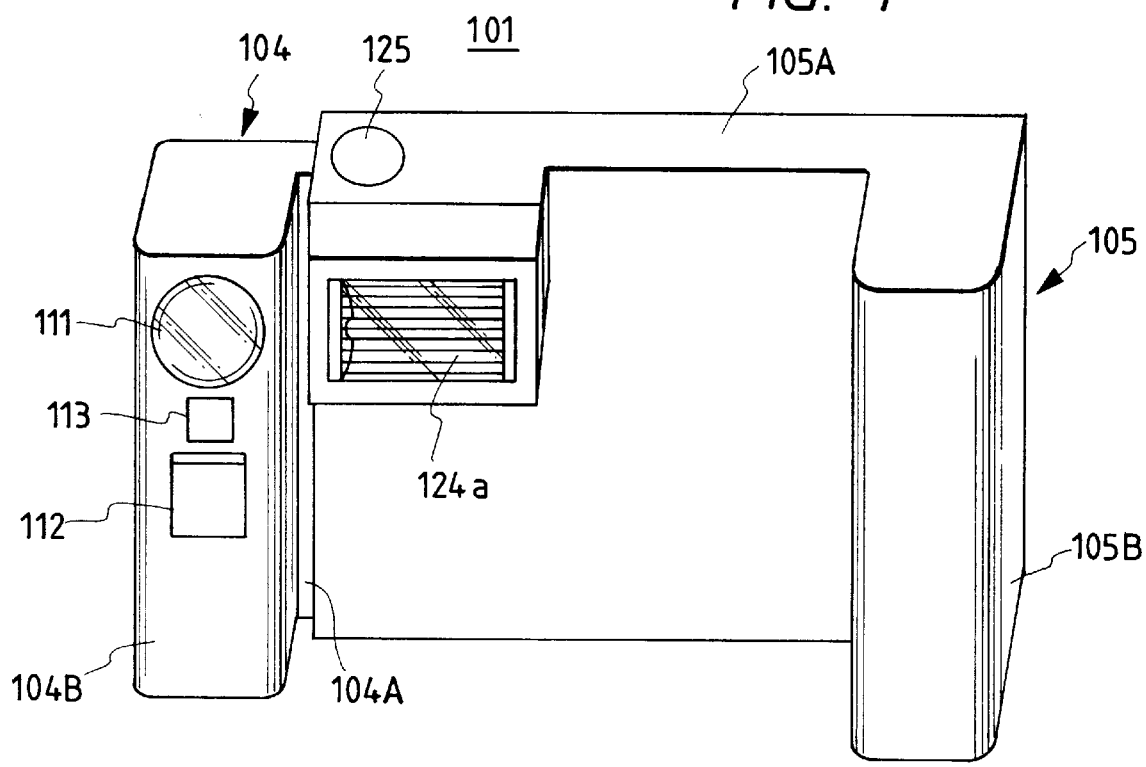
FIG. 1 is a perspective view showing an embodiment of the electronic still camera of the present invention.
Figure 2:
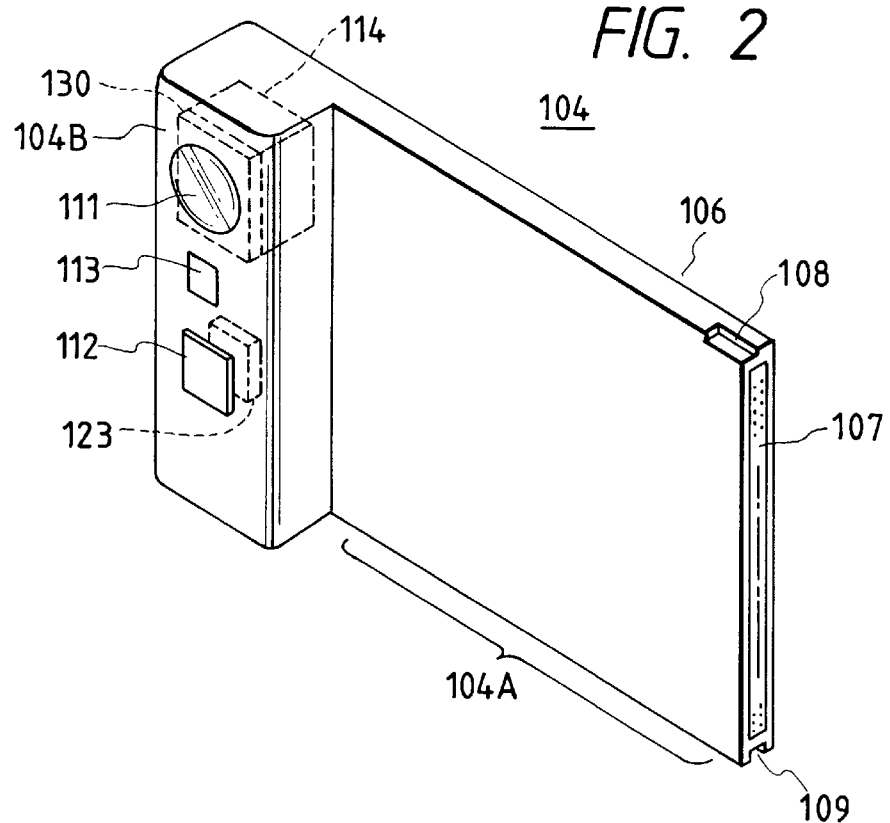
FIG. 2 is a perspective view of a camera body.
Figure 3:
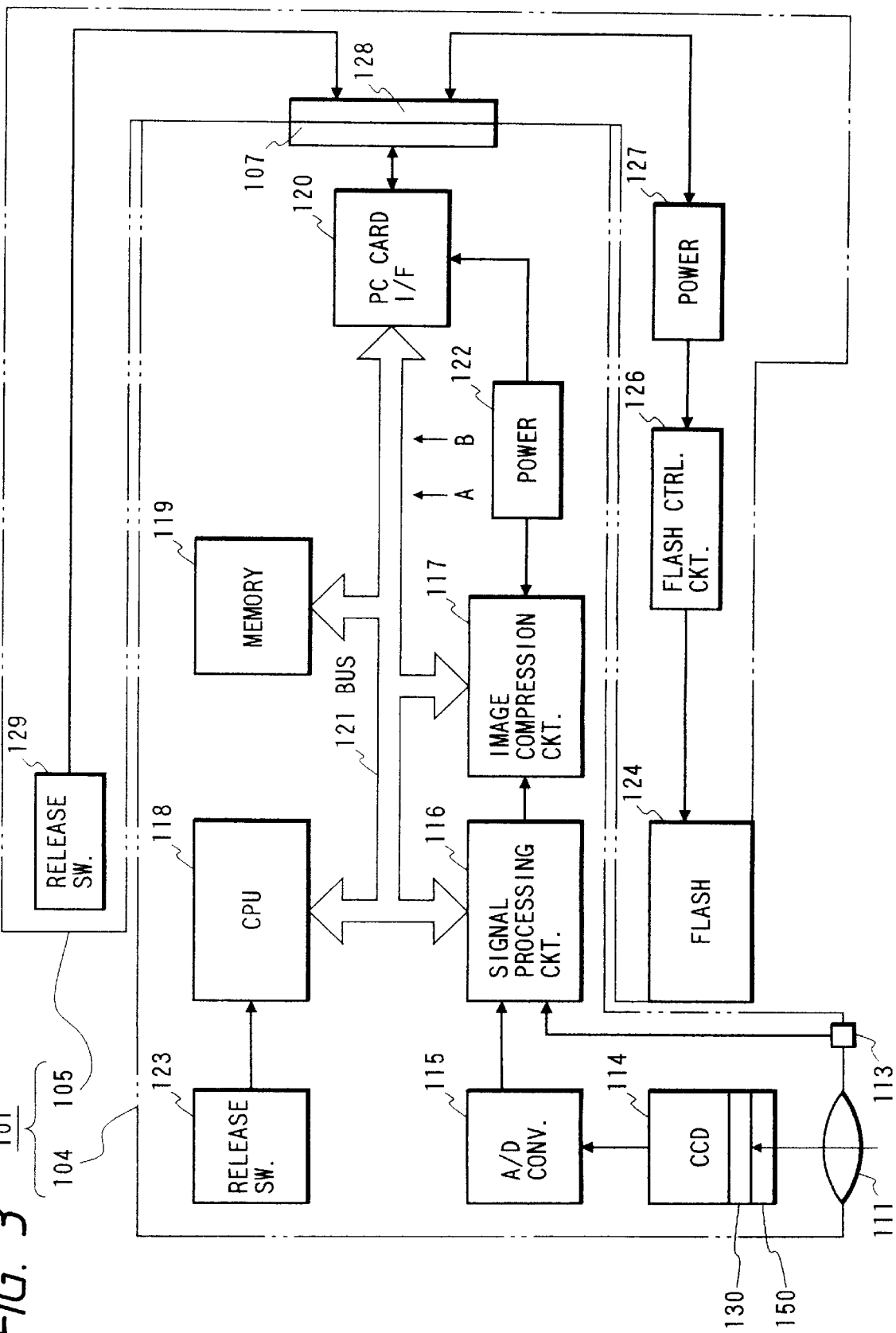
FIG. 3 is a block diagram of the electronic still camera.
Figure 4:
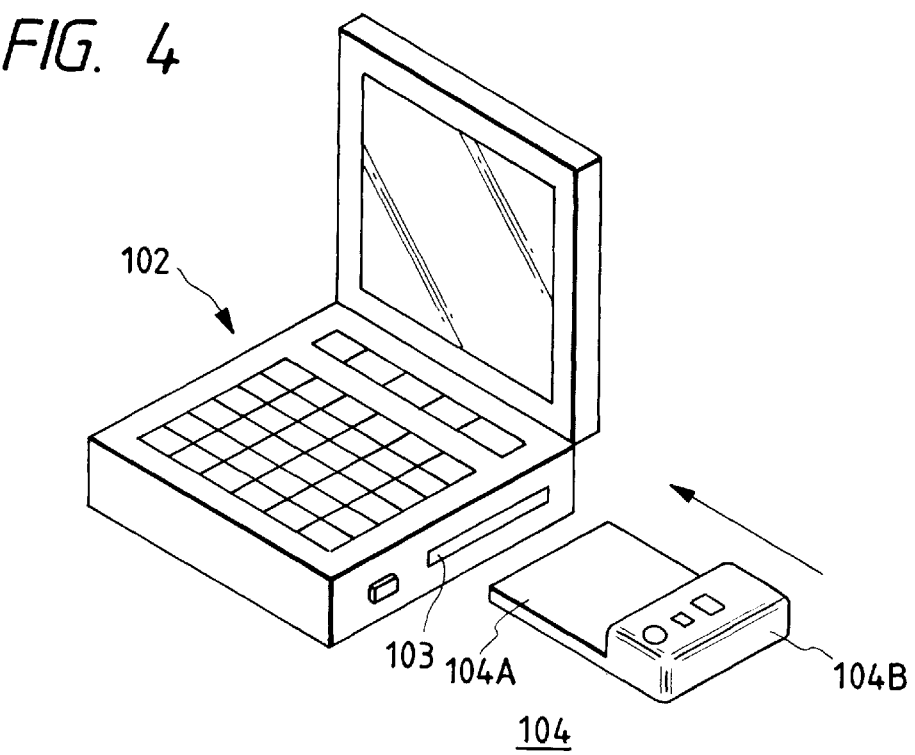
FIG. 4 is a view showing the mode of insertion of the camera body into a PC card slot of a personal computer.

FIG. 1 is a perspective view showing an embodiment of the electronic still camera of the present invention, FIG. 2 is a perspective view of a camera body; FIG. 3 is a block diagram of the above-mentioned camera, and FIG. 4 is a view showing the mode of insertion of the camera body into a PC card slot of a personal computer. As shown in these drawings, the electronic still camera 101 is provided with a camera body 104 which can be inserted into a PC card slot 103 provided on a lateral face of a personal computer 102 constituting an external device, and a cover member 105 which normally covers a portion 104A, of the camera body 104, to be inserted into the above-mentioned PC card slot 103 (such portion being hereinafter called slot fitting portion).

The camera body 104 is provided with a camera case 106, formed for example with a plastic material and metal plates. The camera case 106 has a laterally oblong rectangular shape when seen from front and an L-letter shape when seen from above, and is composed of the slot fitting portion 104A mentioned above and an unfitting portion 104B which is integrally connected to a lateral edge of the slot fitting portion 104A in the longitudinal direction thereof and which is not inserted into the PC card slot 103. In order to be inserted in the PC card slot, the slot fitting portion 104a is formed as a flat plate of an external dimension meeting the dimensional standard I, II, III or IV of the IC memory card or the I/O card (hereinafter collectively called PC card) according to the standards of PCMCIA (Personal Computer Memory Card International Association/JEIDA (Japan Electronic Industry Development Association), thereby constituting a PC card member.

The present embodiment adopts the dimensional standard of type I of the PC card member with a width of 85.6±0.2 mm, a height of 54.0±0.1 mm and a thickness of 3.3±0.1 mm. Consequently the slot fitting portion 104A of the camera body 104 can be directly inserted into the PC card slot 103 of the personal computer 102. The slot fitting portion 104A is provided, at an end thereof opposite to the unfitted portion 104B, with a PC card connector 107, defined in the above-mentioned PCMCIA/JEIDA standard, for making connection with an unrepresented connector in the PC card slot 103. This connector 107 has 68 pins according to the PC card standard, and is further provided with a notch 108 and a groove 109 for preventing an inverted insertion into the PC card slot 103.

On the other hand, the unfitting portion 104B constitutes an optical system housing unit, housing a phototaking lens, an image pickup device, a filter and the like to be explained later, and is so formed as to protrude from the front surface (or rear surface or both surfaces) with a thickness of about 10 mm. It is thus not inserted into the PC card slot 103 or the cover member 105. On the surface of the unfitting portion 104B there are provided a phototaking lens 111, a shutter release button 112 and a white balance sensor 113.

Such camera body 104 houses therein the PC card connector 107, various circuits required for phototaking or signal storage, and a power source as shown in FIG. 3. More specifically, there are provided, as shown in FIG. 3, a CCD image sensor 114 for converting the light, transmitted by the phototaking lens 111, into an electrical signal, an A/D converter circuit 115 for converting the output signal of the CCD 114 into digital data, a signal processing circuit 116 for converting the digital data from the A/D converter circuit 115 into image signals, and an image compression circuit 117 for compressing the image signals released from the signal processing circuit 116.

There are also provided a CPU 118 for controlling the electronic still camera 101, a memory device 119 composed for example of a flash memory or a static RAM (SRAM) for storing the image signals, and a PC card interface circuit 120 for effecting protocol conversion between the IC memory card interface or the I/O card interface of the PCMIA/JEIDA standard (hereinafter called PC card interface) and the above-mentioned memory device 119.

There are further provided a bus 121, a power source 122 such as a nickel-hydrogen battery or a nickel-cadmium battery for supplying the electronic still camera with an electric power, and a release switch 123 to be operated by the actuation of the shutter release button 112.

The cover member 105 mentioned above, being molded with a plastic material in an L-letter shape in plan view, is composed of a cover body 105A of a thin box shape, which is open at an end face thereof for accepting the slot fitting portion 104A of the camera body 104, and of a grip portion 105B which is integrally protruding to the front from the closed end of the cover body 105A. The cover body 105A is provided, in a suitable position on the front face thereof, with a light emitting window 124a of an electronic flash device 124 which effects automatic light emission according to the luminance of the object, and, on the upper face thereof, with a shutter release button 125 for effecting the phototaking operation in the camera body 104 when the cover member 105 is mounted thereon. The grip portion 105B, to be supported together with the unfitting portion 104B of the camera body 104 by a hand at the phototaking operation, houses therein the above-mentioned electronic flash device 124, a flash control circuit 126, a power source 127, a connector 128 to which the PC card connector 107 of the camera body 104 is to be connected, and a release switch 129. There are also provided a complementary color filter 130, and an LCD mask member 150 for covering the image pickup face thereby obtaining a vertically or horizontally oblong image field.

By inserting the slot fitting portion 104A of the camera body 104 into the above-explained cover member 105 so as to mutually connect the connectors 107 and 128, it is no longer necessary to hold the slot fitting portion 104A, composed of a thin PC card member, with the hand, and it is rendered possible to protect the PC card connector 107 from intrusion of water or dust, or from damage or breakage during carrying.

Figure 5A:
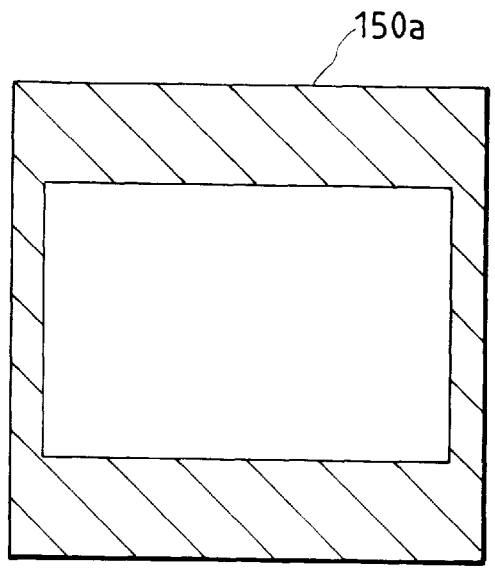
FIGS. 5A and 5B are views showing patterns of an LCD mask.
Figure 5B:
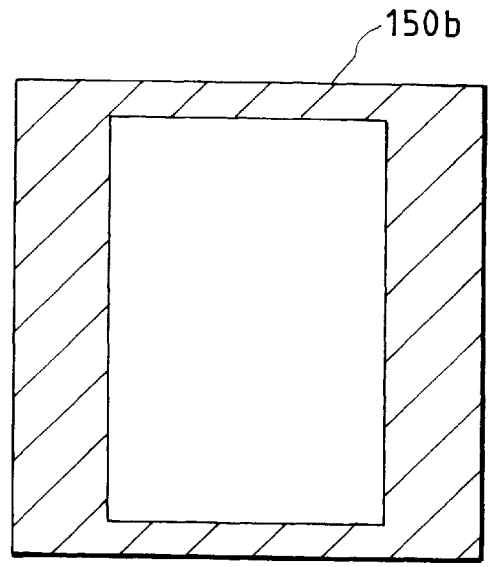
Figure 6:
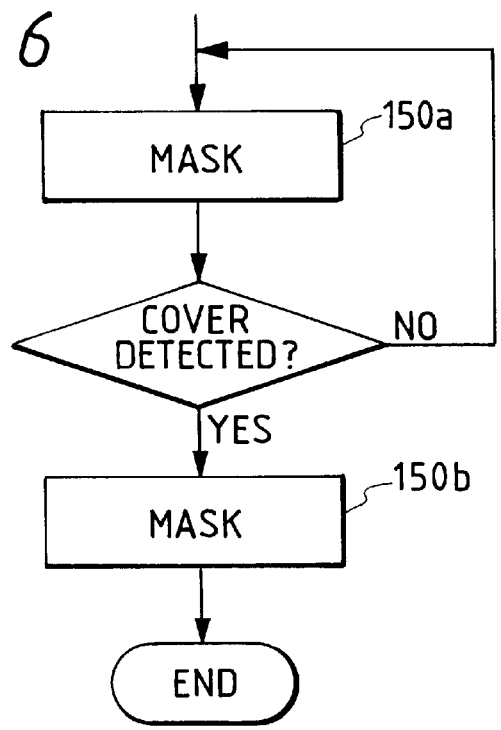
FIG. 6 is a flow chart showing a mask selection process.

The above-mentioned LCD mask 150 is switched, as shown in FIGS. 5A and 5B, between a horizontally oblong pattern 150a and a vertically oblong pattern 150b according to the mode of use of the camera body 104. When the cover member 105 is not fitted, the camera body 104 is usually used in the vertical position. In this state, in order to obtain a horizontally oblong image frame, there is used the mask pattern 150a. On the other hand, when the cover member is fitted, the camera body is used in the horizontal position, in which the above-mentioned image frame becomes vertically oblong. Thus the mask pattern 150b is used in this case to obtain a horizontally oblong image frame. The mask patterns 150a and 150b are switched by the CPU 118, in response to the detection whether the cover member 105 is fitted or not. FIG. 6 is a flow chart showing such mask pattern switching process.

In the following there will be explained the function of the electronic still camera 101 described in the foregoing.

The phototaking operation is possible either in a state where the cover member 105 is not fitted on the camera body 104 or in a state where the cover member 105 is fitted thereon. The CPU 118 discriminates whether the power source 127 of the cover member 105 is connected by the fitting thereof, and, if connected, uses the shutter release button 125 and the power source 127 of the cover member 105, but, if not connected, uses the shutter release button 112 and the power source 122 of the camera body 104, since the cover member 105 is mechanically and electrically not connected to the camera body 104. The power source 127 of the cover member 105 is preferentially used because the cover member 105 can contain a larger power source owing to less structural limitation thereof and also because the electronic flash device 124 has a high electric power consumption. Also when the cover member 105 is fitted, the LED mask 150 is switched to the vertically oblong mask pattern 150b.

In the fitted state of the cover member 105, when the release switch 129 is activated by the actuation of the shutter release button 125, the light coming from the object and transmitted through the phototaking lens 111 is separated, by the complementary color filter 130 of the CCD image sensor 114, into yellow (Ye), cyan (Cy), magnet (Mg) and green (G) components, which are converted into electrical signals by the pixels of CCD image sensor 114, respectively corresponding to the Ye, Cy, Mg and G color filters. In this manner color signals Ye, Cy, Mg and G are released from the CCD image sensor 114.

The A/D converter circuit 115 converts these color signals Ye, Cy, Mg, G into digital data.

Then the signal processing circuit 116, composed for example of a DSP (digital signal processor), generates image signals from these digital data. The image signals employed in the present embodiment are a luminance signal Y obtained by color conversion which is one of the processes conducted by the DSP, a color difference signal R-Y obtained by subtracting the luminance signal Y from the red color signal R, and a color difference signal B-Y obtained by subtracting the luminance signal Y from the blue color signal B.

In addition to the color conversion, the signal processing circuit 116 executes, for example, pixel interpolation, horizontal and vertical contour enhancement, and gamma (γ) correction. After these processes, the signal processing circuit 116 sends the image signals to the image compression circuit 117. The image compression circuit 117 once stores an image signal output from the signal processing circuit 116 in a memory (not shown). Thereafter the image compression circuit 117 performs a JPEG (Joint Photographic Experts Group) format compression process of the image signal.

In the present embodiment, the CCD image sensor 114 employs color filters 113 of complementary colors, but there may also be employed those of primary colors of red (R), green (G) and blue (B). In such case the image signals may be formed by the signal processing circuit 116 from the three primary color signals R, G, B obtained from the CCD image sensor 114.

When the shutter release button 125 is depressed lightly, the CPU 118 so controls the CCD 114, the A/D converter 115 and the signal processing circuit 116 as to fetch the image signals in a memory of the image compression circuit 117 as explained in the foregoing.

Then, based on the luminance of the image signals prior to the compression, the signal accumulating time of the CCD image sensor 114 is so adjusted as to obtain the image of an optimum brightness.

Then, when the shutter release button 125 is depressed deeper, the CPU 118 causes the image compression circuit 117 to fetch the image signals, with such adjusted signal accumulating time, in the memory thereof. These signals are the normal data fetched in response to the actuation of the shutter release button 125. In such electronic shutter operation for the CCD 114 for reading the signal charges obtained only during the signal accumulating time, the adjustment of the signal accumulating time allows image signals of an optimum brightness to be obtained.

Subsequently the CPU 118 reads the image signals, compressed in the JPEG format, from the image compression circuit 117, and writes these data in a predetermined area of the memory device 119 in the DOS-FAT (disk operating system/file allocation table) format, so as to be utilizable by a personal computer employing the MS-DOS operating system. In this manner, in response to the depressions of the shutter release button 125, there are repeated recordings of the compressed image signals in the areas of the memory device 119, whereby image signals of plural images are recorded.

After the phototaking operation, the camera body 104 is extracted from the cover member 105 and the slot fitting portion 104A is inserted into the PC card slot 103 of the personal computer 102. Upon insertion, the PC card connector 107 of the camera body 104 is connected to the connector in the PC card slot 103, whereby the camera body 104 is electrically connected to the personal computer 102. Thus the personal computer 102 makes access, through an unrepresented internal PC card interface (PC card controller), to the memory device 119 of the camera body 104, thereby reading the image signals stored in the memory device 119.

In this operation, the PC card interface circuit 120 effects protocol conversion between the memory device 119 and the PC card interface, thereby enabling the communication between the memory device 119 and the personal computer 102 (PC card interface).

The above-mentioned protocol conversion varies depending on the specification of the PC card interface between the PC card interface circuit 120 and the personal computer 102. For example, if the memory device 119 is a flash memory of ATA (AT attachment) specification, there is executed an ATA-PC card interface conversion, and, if it is a flash memory of AIMS (auto indexing mass storage) specification, there is executed an AIMS-PC card interface conversion.

The image signals obtained in the electronic still camera 101 can thus be utilized in the personal computer 102.

In the present embodiment, the image signals are compressed by the image compression circuit 117, but, if the number of the image signals to be recorded in the memory device 119 is limited, the image signals without compression may be directly stored in the memory device 119.

In the foregoing description, the personal computer 102 has been explained as the external device for reading the image signals, but there may also be employed a PC card drive device having a PC card slot, and, in such case, the data read in such PC card drive device are transferred to the personal computer.

In the present embodiment, the circuits of the camera side including the signal processing circuit 116, and the image compression circuit 117 and the CPU 118 and the circuits of the PC card interface side including the PC card interface circuit 120 are both connected to the memory device 119 through the bus 121, but such configuration may result in a drawback of simultaneous accesses from the camera side and the interface side to the memory device 119.

For this reason, bus buffers are provided in points A and B on the bus 121, and, in the normal state where the electronic still camera 101 is not inserted into the PC card slot 103, the bus buffer A is maintained in a closed (conductive) state while the bus buffer B is maintained in an open (non-conductive) state, whereby the camera side and the memory device 119 are mutually connected whereas the memory device 119 and the PC card interface circuit 120 are mutually disconnected.

When the power supply voltage is supplied from the personal computer 102 to a power supply pin of the PC card connector 107 upon insertion of the electronic still camera 101 into the PC card slot 103, the bus buffer A is shifted to the open state while the bus buffer B is shifted to the closed state, whereby the camera side and the memory device 119 are mutually disconnected whereas the memory device 119 and the PC card interface circuit 120 are mutually connected.

The above-mentioned drawback can thus be resolved by a simpler configuration than providing a controller on the bus 121.

The embodiment shown in FIG. 3 employs the PC card interface circuit 120 as the interface means for communication with the external equipment, but, as another embodiment, the CPU 118 may also be used for such interface means.

In such case, the PC card interface circuit 110 serves as a bidirectional input/output buffer. Thus, in case of an access from the personal computer 102, the connection from the camera side to the personal computer side is disconnected, and, in case of an access from the camera, the connection from the personal computer side to the camera side is disconnected.

Figure 7:
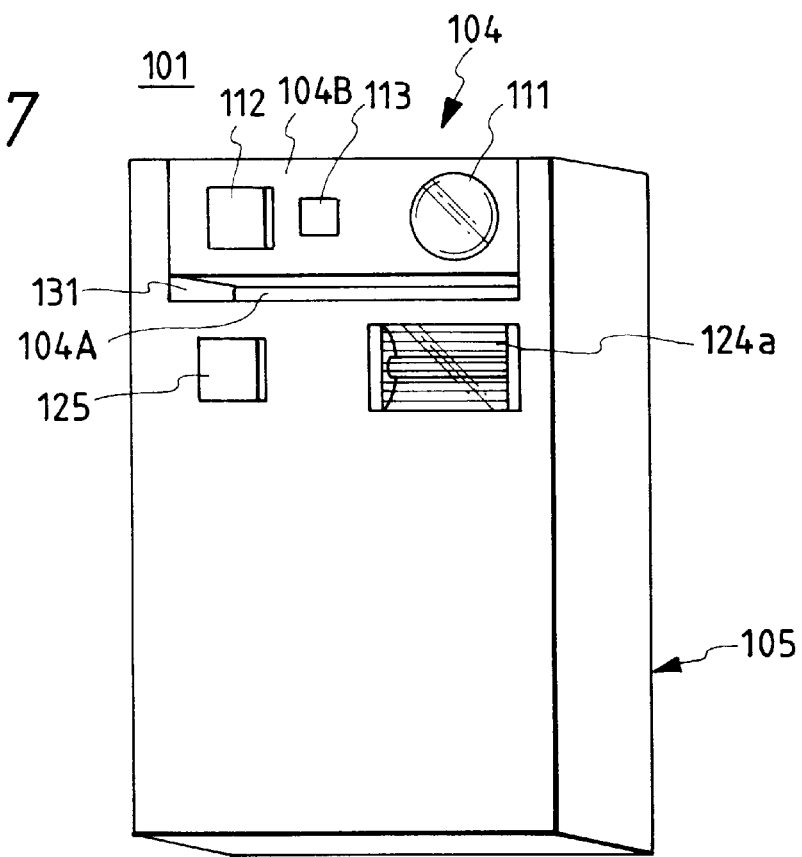
FIG. 7 is a perspective view of another embodiment of the present invention.
Figure 8:
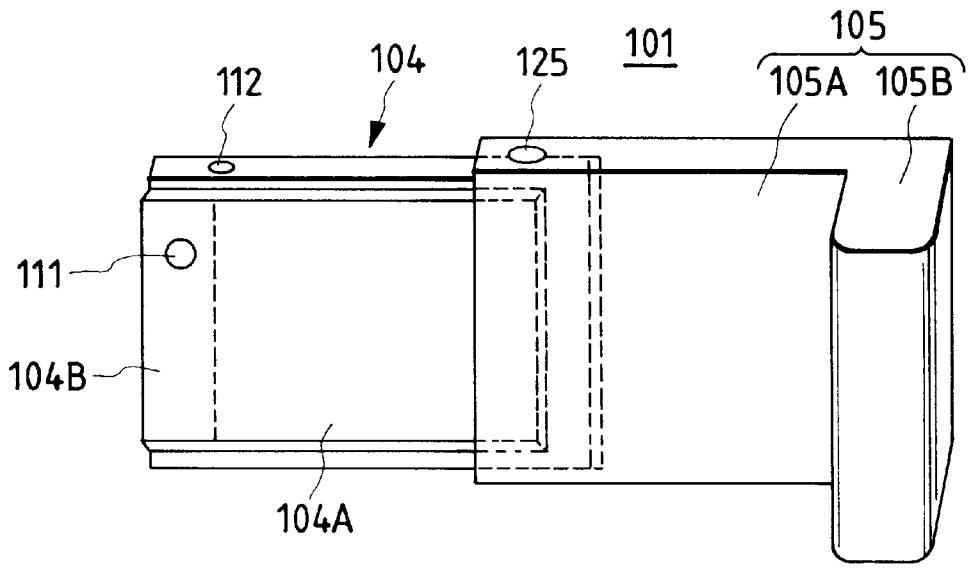
FIGS. 8 and 9 are views showing still other embodiments.

FIG. 7 is a perspective view showing another embodiment of the present invention, wherein the camera body 104 is formed in a vertically oblong shape, and the unfitting portion 104B is integrally formed in protruding manner at the upper end of the front side of the slot fitting portion 104A, while the cover member 105 is formed as a vertically oblong thin box with an open upper face, forming an aperture 131 for accommodating the unfitting portion 104B. The cover member 105 however lacks the grip portion. Other configurations are same as those in the foregoing embodiment FIG. 8 is a perspective view showing still another embodiment of the present invention, wherein the entire camera body 104 is formed according to the dimension of the type III of the PCMCIA/JEIDA standard, with a width of 85.6±0.2 mm, a height of 54.0±0.1 mm and a thickness of 10.5 mm at maximum. Such camera body 104 has a sufficient thickness for incorporating the optical system unit including the phototaking lens and the CCD image sensor, so that the unfitting portion 104B, housing the optical system, need not protrude to the front and/or rear side of the slot fitting portion 104A. Such camera body 104, having the external shape of the type III mentioned above, is completely inserted into the PC card slot 103 of the personal computer. However, into the cover member 105, the slot fitting portion 104A alone is inserted while the unfitting portion 104B remains protruding from the cover member 105, in order to enable the phototaking operation. Also in this embodiment, the cover member 105 may be provided with an aperture 131 as in the foregoing embodiment shown in FIG. 7, in order to expose the unfitting portion 104B to the outside and thereby to completely accommodate the camera body 104 within the cover member 105. The cover member 105 of this embodiment is provided with an integral grip portion 105B, but lacks the electronic flash device.

Other configurations are same as those in the foregoing embodiments shown in FIGS. 1 to 7.

Figure 9:
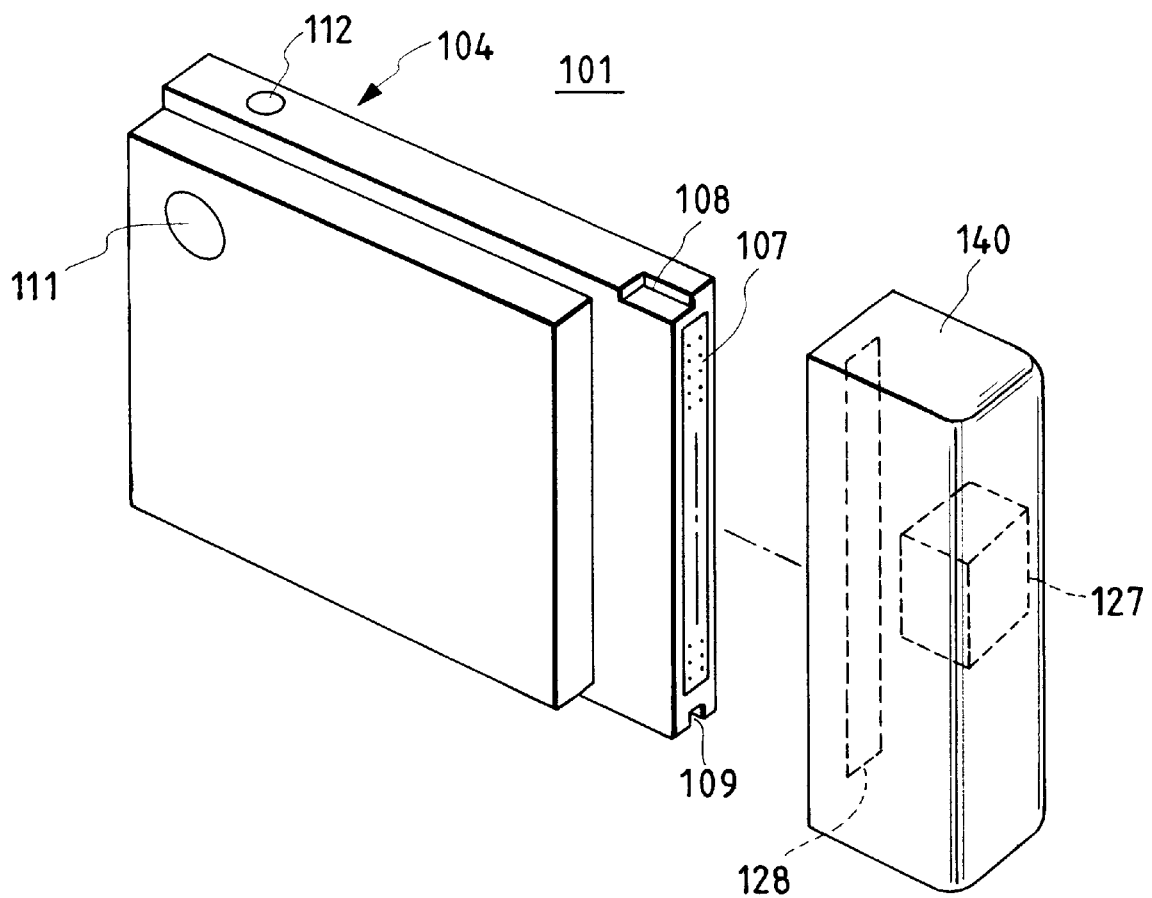

FIG. 9 is a perspective view showing still another embodiment of the present invention, wherein the entire camera body 104 is formed according to the dimension of the type III of the PCMCIA/JEIDA standard as in the embodiment shown in FIG. 8, and a battery case 140 is detachably connected to the PC card connector 107. The battery case 104 houses a power source 127 and a connector 128 to be connected with the PC card connector 107 of the camera body 104.

Other configurations are same as those in the foregoing embodiments shown in FIGS. 1 to 7.

Also in this embodiment, the battery case 140 serves as a grip portion and prevents intrusion of water or the like into the PC card connector 107, in the same manner as the cover member 105 mentioned above.

As explained in the foregoing, the electronic still camera of the present invention comprises a camera body having a PC card slot fitting portion which is insertable into a PC card slot of an external equipment, and a cover member into which detachably inserted is the PC card slot fitting portion of the camera body, wherein the camera body houses an image pickup device for converting the optical information from an object into electrical signals, a memory device for storing the output signals of the image pickup device, interface means for effecting communication between a PC card interface of the external equipment and the memory device when the camera body is inserted into the PC card slot of the external equipment, and a PC card connector for connecting with a connector provided in the PC card slot, whereby the cover member can protect the PC card slot fitting portion from damage or breakage during carrying and prevent the intrusion of rainwater or the like into the PC card connector.

The camera body, being provided therein with the memory device and the PC card connector, can be directly inserted into the PC card slot of a personal computer or an external device such as a PC card drive device connected to the personal computer to simplify the connection with the external devices in utilizing the obtained image signals, in contrast to the conventional electronic still camera in which the memory medium has to be extracted from the camera and reloaded into the slot of the external device. Furthermore, since the PC card driver software which is normally incorporated in the personal computer can be used, the exclusive driver software required when the camera and the external equipment are connected with a communication cable is no longer needed. Consequently the external equipment can read the data from the electronic still camera, in the same manner as in the data reading from the flexible disk or the magnetic disk.

Furthermore, as the electronic flash device and the control circuit therefor are incorporated in the cover member, the camera body itself can be made smaller and lighter, and there can still be achieved automatic flash emission according to the luminance of the object thereby enabling phototaking operation with an appropriate exposure. Furthermore a grip portion provided in the cover member ensures stable holding of the camera at the phototaking operation.

Furthermore, a mask member provided for covering the image pickup face allows the size of the image frame to change, according to the vertical or horizontal positioning of the camera body.

[Second embodiment]

FIGS. 10 to 16 illustrate a second embodiment of the electronic still camera of the present invention and variations thereof, wherein shown are an electronic still camera 1 featuring the present invention, and a camera accessory 2 which is selectively mounted on the electronic still camera 1.

Figure 16:
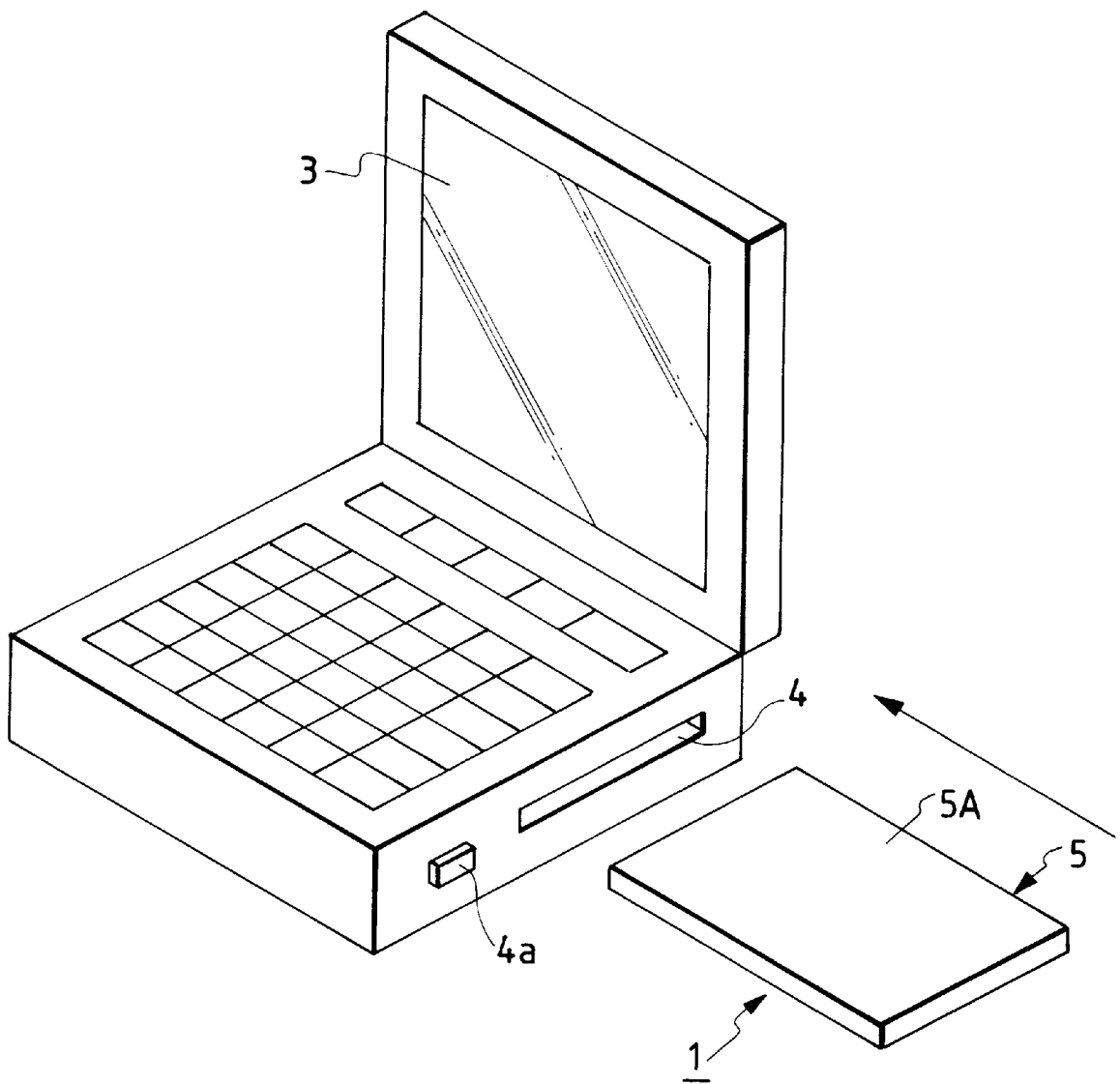
FIG. 16 is an exploded perspective view showing the mode of mounting of the electronic still camera shown in FIGS. 14A, 14B, 15A and 15B into the PC card slot.

As shown in FIG. 16, the electronic still camera 1 is composed of a camera body 5 having a slot fitting portion 5A which can be inserted into a PC card slot 4 provided in an external device such as a personal computer 3.

An eject button 4a, provided on a lateral face of the personal computer 3, is to be actuated in order to the extract the camera body 5 (slot fitting portion 5A) inserted in the PC card slot 4. The slot fitting portion 5A cannot be extracted without the actuation of such eject button 4a.

As shown in FIGS. 10, 11, 14A, 14B, 15A and 15B, the camera body 5 is provided with a camera case 6, composed for example of a plastic material and/or thin metal plates. The camera case 6 has a laterally oblong rectangular shape in plan view and a rectangular shape in lateral view, having the slot fitting portion 5A mentioned above.

In the embodiment shown in FIGS. 10 to 16, the camera body 5 is formed as a PC card member having the dimension of the type III with a width of 85.6±0.2 mm, a height of 54.0±0.1 mm and a thickness of 10.5 mm at maximum, whereby the slot fitting portion 5A of the camera body 5 can be directly inserted into the PC card slot 4 of the personal computer 3.

At the end of the slot fitting portion 5A, there is provided, as shown in FIGS. 11 to 15B, a PC card connector 7 of the PCMCIA/JEIDA standard for connection with an unrepresented connector provided in the PC card slot 4. The connector 7 has 68 pins accordi ng to the PC card standard, and is provided with a notch 8a and a groove 8b, for avoiding.inverted insertion into the PC card slot 4 (cf. FIGS. 14A and 14B).

Consequently the slot fitting portion 5A of the camera body 5, constituting the electronic still camera 1, can be directly inserted into the PC card slot 4 of the personal computer 3. There is preferably provided a cap for avoiding the exposure of the connector 7 at the phototaking operation of the camera 1.

In the foregoing an example of forming the slot fitting portion 5A of the electronic still camera 1 according to the type III of the PC card standard was explained, but such example is not restrictive and there may be employed any appropriate standard. For example, the PC card standard defines the type I with a width of 54.0±0.1 mm, a length of 85.6±0.2 mm and a thickness of 3.3±0.1 mm, the type II with a width of 54.0±0.1 mm, a length of 85.6±0.2 mm and a thickness of 3.3±0.1 mm with a maximum thickness of 5.0 mm in the main body portion, the type III with a width of 54.0±0.1 mm, a length of 85.6±0.2 mm and a thickness of 10.5 mm at maximum, and the type IV with a width of 54.0±0.1 mm, a length of 85.6±0.2 mm and a thickness of 16.0 mm at maximum.

Figure 14A:
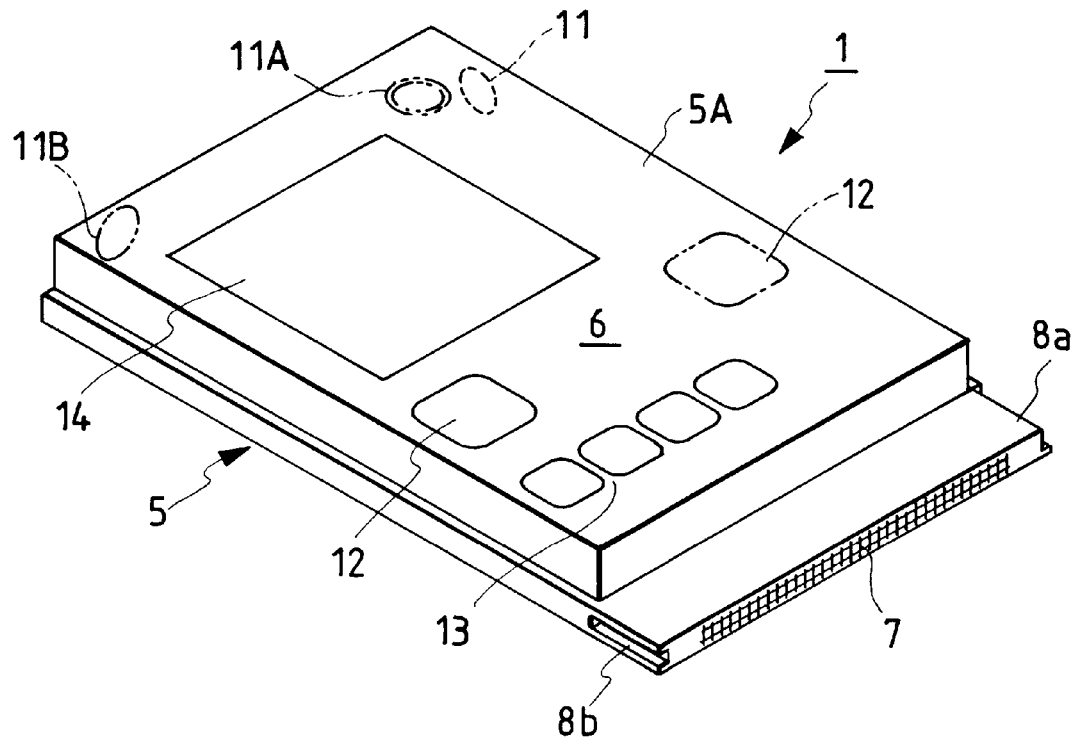
FIGS. 14A and 14B are perspective views, seen from diagonally above, of the camera body of the electronic still camera shown in FIG. 10.
Figure 14B:
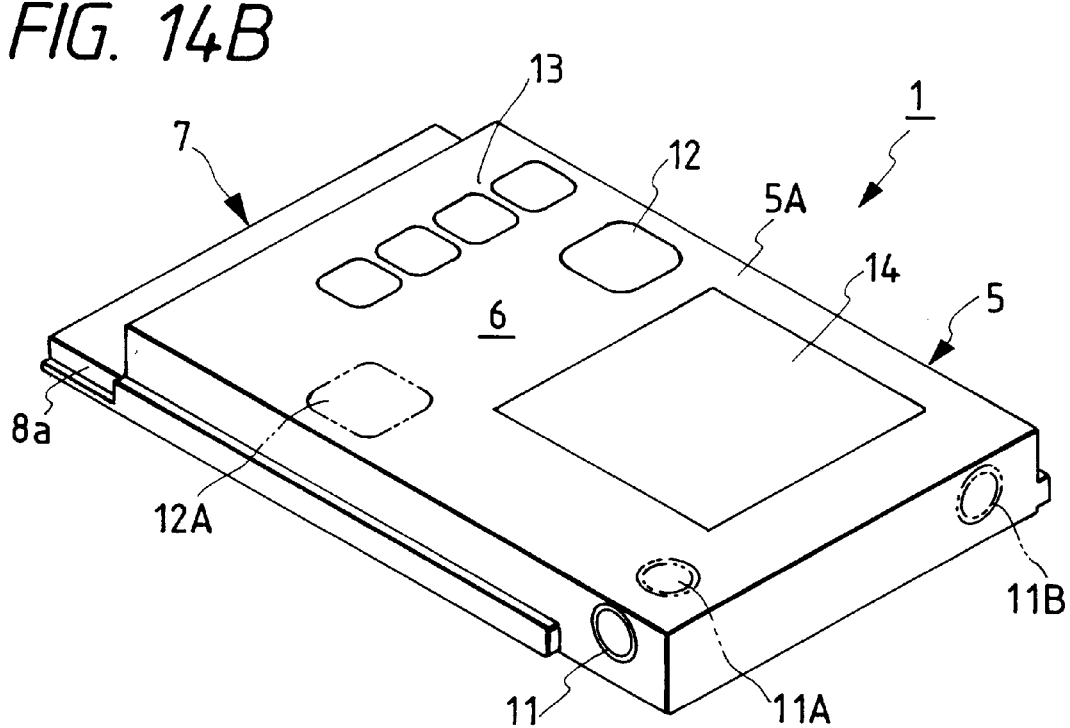

In the present embodiment, the camera body 5 of the electronic still camera 1 is so formed as to be entirely accommodated in the PC card slot 4. As shown in FIG. 14A and 14B, a phototaking lens 11 (or 11A or 11B) is provided on a lateral face, on an upper face or on an external edge.

Also as shown in FIGS. 10, 14A and 14B, a shutter release button 12, functional buttons 13 and an LCD display panel 14, for displaying various information, are provided on the top face of the slot fitting portion 5A.

The shutter release button 12 may be provided in a position 12 or 12A, according to the position 11, 11A or 11B of the phototaking lens.

The display panel 14 is used for displaying an object image field as a view finder, displaying the recorded image for the purpose of confirmation or reproduction, and displaying the data of phototaking operation and the remaining capacity of the battery or the memory device.

Figure 13:
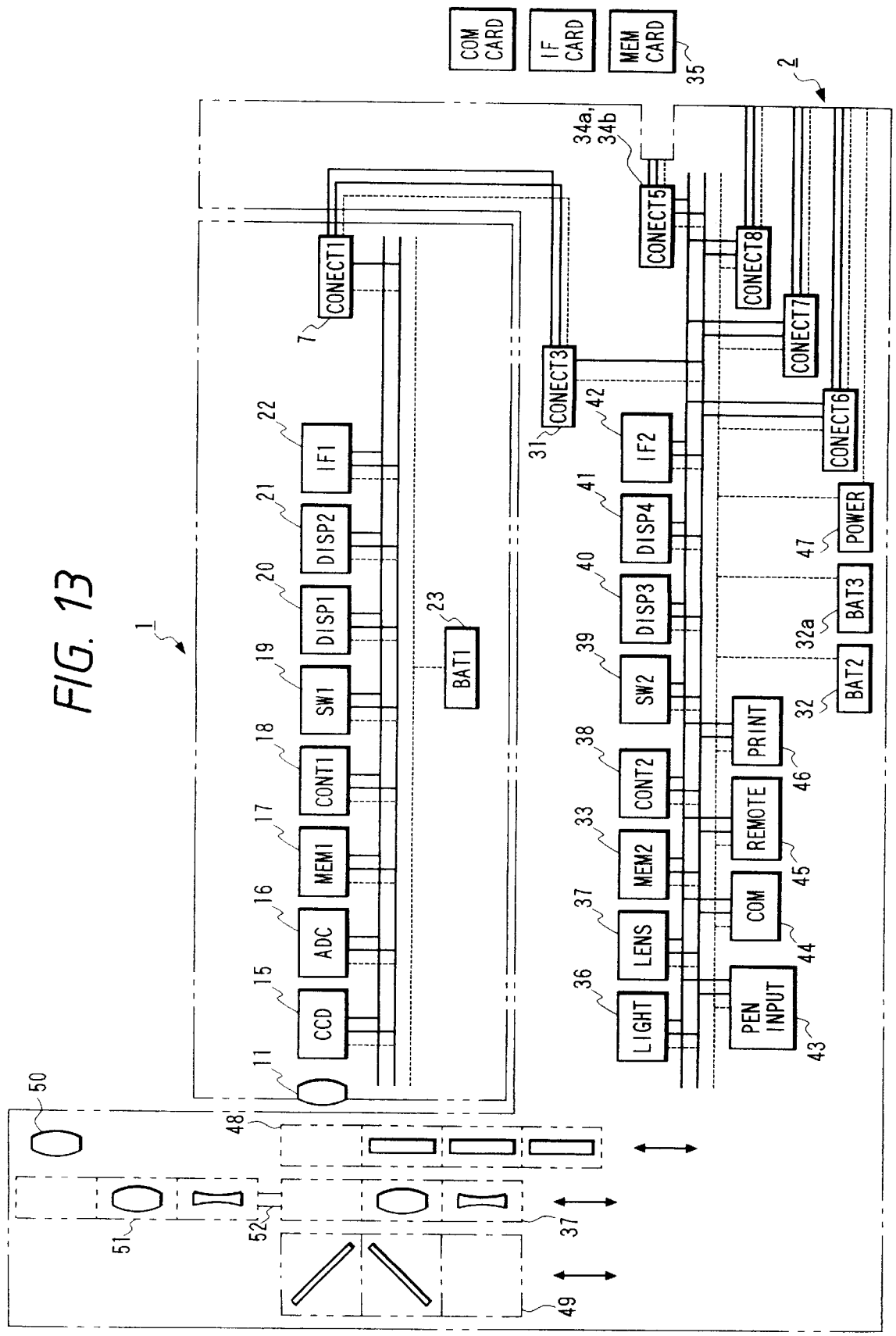
FIG. 13 is a block diagram of the electronic still camera shown in FIGS. 10 to 12, in a combined state with the camera accessory.

Such camera body 5 houses therein the PC card connector 7, various circuits required for phototaking and storage, and a power source, as shown in FIG. 13. More specifically, there are provided, as shown in FIG. 13, a CCD image sensor 15 constituting an optical system unit together with the phototaking lens 11 and serving to convert the light transmitted therethrough into electrical analog signals, an A/D converter circuit (ADC) 16 for converting the output signals of the CCD 15 into digital data, a memory device 17 (MEM1) composed for example of a flash memory or a static RAM (SRAM) for storing the digitized image signals, a control circuit 18 (CONT1) serving as a signal processing unit including a CPU for effecting control of the phototaking operation and on the image signals (including compression control therefor), and a switch 19 (SW1) for effecting various settings on the phototaking operation and on the image signal control by the operator, to be on-off controlled by the shutter release button 12 and the functional buttons 13.

In FIG. 13 there are further shown a first display member 20 (DISP1) for displaying various set conditions such as phototaking conditions and image signal controlling conditions, a second display member 21 (DISP2) for displaying the taken image signals, and an interface unit 22 (IF1) for controlling the signal exchange among various units, including the personal computer 3 and the camera accessory 2. There is further provided a PC card connector 7 (CONNECT1) as explained in the foregoing, and a battery 23 (BAT1), composed for example of a fixed or interchangeable Ni—Cd thin battery, is mounted on a circuit board 24 (FIGS. 11 and 12).

In FIG. 13, fine solid lines connecting the above-mentioned blocks indicate the flows of signals defining the phototaking conditions or the like, thick solid lines indicate the flows of signals controlling the image data, and fine broken lines indicate the flows of power supply On the other hand, the camera accessory 2 is formed into a thin box shape as shown in FIGS. 10 and 11, having a camera inserting portion 30 with an aperture 30a at an end, and is integrally combined with the camera body 5 by the insertion of the slot fitting portion 5A thereof into the inserting portion 30.

The camera accessory 2 is provided therein, as shown in FIG. 11 with a connector 31 (CONNECT3 in FIG. 13) connectable with the PC card connector 7 which is provided at the end of the slot fitting portion 5A of the electronic still camera 1 for connection with the connector (not shown) of the PC card slot 4.

In the present embodiment, the camera accessory 2 is further provided therein with second and third batteries 32, 32a (corresponding to BAT2, BAT3 in FIG. 13) and a second memory device 33 (corresponding to MEM2 in FIG. 13). The second battery 32 is a fixed and rechargeable battery while the third battery 32a is a replaceable battery, and these batteries function in combination as a second battery. Stated differently, the third battery 32a is practically equivalent to the second battery 32.

FIG. 11 shows a configuration in which the second and third batteries 32, 32a and the second memory device 33 are provided in the camera accessory 2, and FIG. 12 shows a configuration provided with a PC card slot 35 for further accepting a PC card 34 as a second memory device to be connected by connectors 34a, 34b (corresponding to CONNECT5 in FIG. 13).

In case such second battery 32 and third battery 32a are provided, such second or third battery is preferentially used when the camera accessory 2 is mounted on the camera body 5, in order to secure the power supply capacity when the camera body 5 is singly used as the electronic still camera 1.

Also in case the camera accessory 2 is provided with the second memory device 33 or 34 as explained above, there is determined an order of preferential use between such second memory device and the first memory device 17 of the camera body 5.

More specifically, the area for storing the obtained image signal is made selectable from the memory device 17 of the camera 1 and the second memory device 33, 34 of the camera accessory 2, and whether the first memory device 17 or the second memory device 33, 34 is to be used at first may be determined according to the status of use and the necessity. It is preferable to use the memory device 33, 34 of the accessory 2 in case the size of the image signal, determined by the compression rate, is large, and to use the memory device 17 of the camera 1 in case the image signal size is small.

In case there are provided the first and second memory devices as explained in the foregoing, the camera 1 and the accessory 2 are preferably so constructed as to be capable of exchange the stored image data therebetween.

FIG. 13 shows a state in which the electronic still camera 1 and the accessory 2 are mutually connected, wherein the PC card connector 7 and the matching connector 31 can effect signal exchange with various accessories to be explained later, through the signal terminals defined in the standard and also utilizing the unused terminals.

Various functional blocks in the accessory 2 function in mutually independent manner but some blocks function in mutually cooperative manner. FIGS. 10, 11 and 12 show configurations in which a part of the functional blocks is absent.

In FIG. 13, illumination means 36 includes an electronic flash device (LIGHT), generally called strobe light, flash or speedlight, and a control circuit therefor. Lens means 37 (LENS) includes a conversion lens set (a plain glass, a telephoto lens, a wide-angle lens, a close-up lens etc.) switchably provided in front of the phototaking lens 11 of the camera 1 and detection means for detecting the set state thereof. The accessory 2 may also be provided with an optical view finder, of which image angle may be made variable according to the switching of the conversion lens set. Also the shutter speed and the light emission amount of the strobe light at the phototaking operation may also be automatically switched according to the setting of the conversion lens.

The second memory device 33 (MEM2) mentioned above, being used for storing the digitized image signal, is given a larger capacity than in the memory device of the camera 1. It is preferable to store the obtained image signal preferentially in such second memory regardless of the state of use of the first memory device 17, and, when the second memory becomes full, to give an alarm on the display memory 20 or 21 and then to store the image signal in the first memory device 17.

It is furthermore preferable to render the data exchangeable between both memory devices, and to made access to the data of both memory devices when the personal computer 3 is connected to the camera 1.

A control circuit 38 (CONT2) is provided for controlling the phototaking operation and the image signal in the camera 1 and also effecting various controls in the accessory 2. It is preferable to provide the accessory 2 with operation members for phototaking operation, thereby enabling similar operations in the accessory 2.

A switch 39 (SW2), for setting the phototaking conditions, the control on the image signal and the functions of the accessory, is provided in a part of the external surface of the accessory as shown in FIG. 10. Also there are provided plural operation buttons 39a for setting various functions.

A display member 40 (DISP3), for displaying the set conditions of phototaking, image signal control and accessory 2, corresponds to the display member 20 (DISP1) of the camera 1. It is preferable to disable the display on the camera 1 when the accessory 2 is connected.

A display member 41 (DISP4) is provided for displaying the phototaken image data stored in the memory or the image data in the personal computer 3 entered through an interface. An interface unit 42 (IF2) controls the signal exchange among various units, including the camera 1 and the accessory 2.

The aforementioned connector 34a (CONNECT5) for the PC card can accept not only the memory card 35 but also various cards of the PC card standard, such an interface card and a communication card.

When an interface card (IF CARD) is mounted, there can be achieved connection with a computer utilizing common interface, such as SCSI or GPIB. Also when a communication card (COM CARD) is mounted, there can be achieved connection with a computer or an external equipment utilizing telephone communication through a modem, LAN communication or infrared communication.

Data input means 43 (PEN INPUT) utilizing a pressure pen 90 (cf. FIG. 29) is provided on the display member 41 (DISP4), for entering a line image in superposition with the displayed data. The input image data are entered in a different hierarchy from that of the displayed data, and are stored in the memory devices 17, 33, 34.

On the display devices 40, 41 (DISP3, DISP4) there are preferably provided data input means utilizing a pressure pen, for selecting various displayed setting buttons for the phototaking conditions or the like. Such data input means may also be used instead of the shutter release button.

Figure 30:
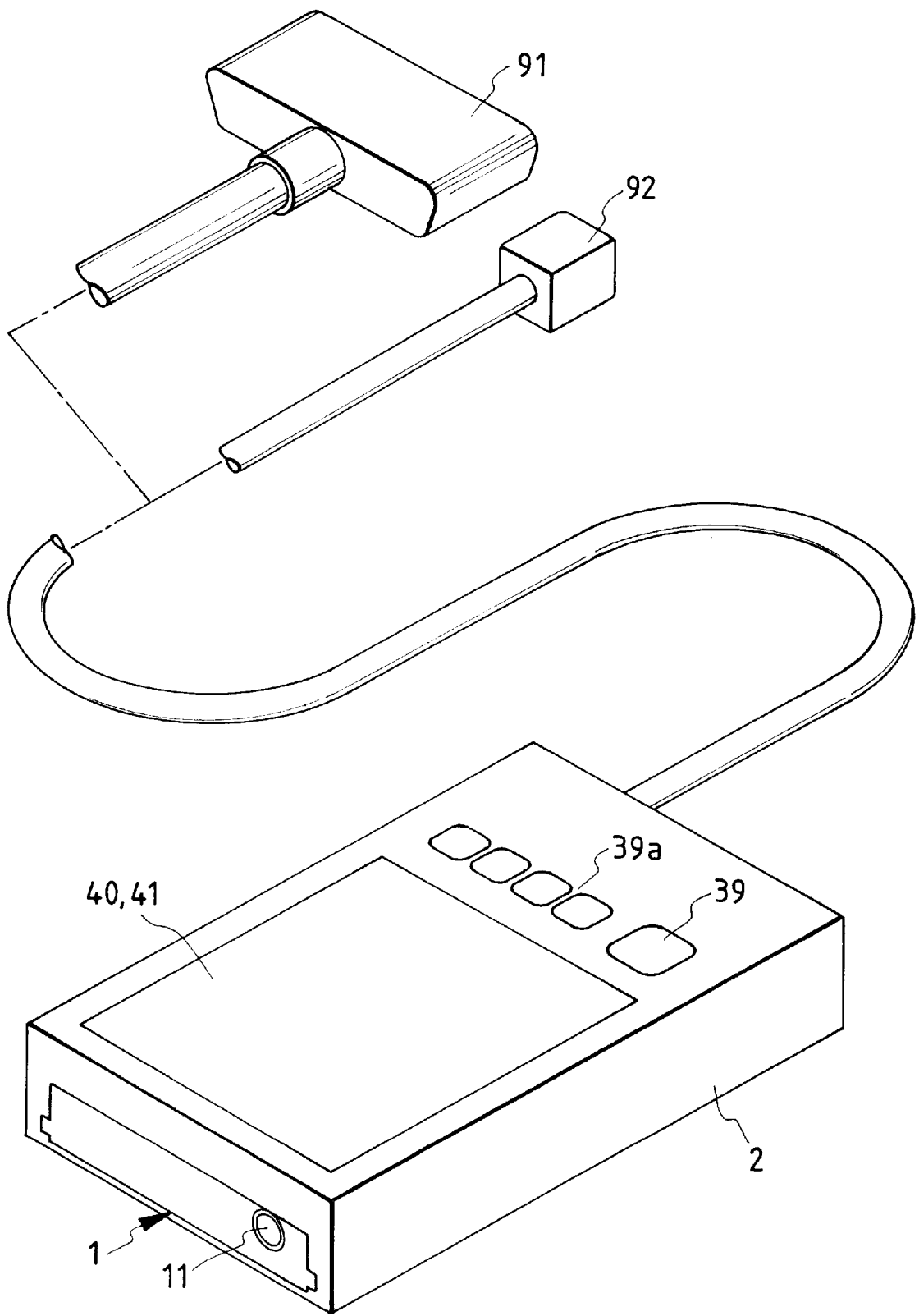
FIGS. 30 and 31 are perspective views showing still other embodiments of the electronic still camera of the present invention, in a combined state with the camera accessory.

A function block 44 (COM), for connection with a computer or an external equipment utilizing a telephone line with a modem, LAN communication or infrared communication, effects connection with the outside through a connector (CONNECT6). In FIG. 30 there are also provided a connector 91, provided at the end of a cable connected to the accessory 2, for connection with a computer, and a modular 92 for connection with a telephone line.

A function block 45 (REMOTE) for remote operation effects connection with a remote controller (93 in FIG. 31) through a connector (CONNECT7). The remote controller 93 may also be constructed integrally with the cable. The CONNECT7 provides a connection to the outside. The remote controller 93 is equivalent to the accessory 2 shown in FIG. 20A, 20B, 21A or 21B, and equivalent components are represented by same numbers.

A function block 46 (PRINT) for direct output to the printer effects connection with a printer through a connector (CONNECT8), thereby displaying the output conditions and effecting the printer control relating to the input/output of the set conditions. In this manner a printed output can be obtained without relaying on the computer.

A charging connection unit 47 (POWER) is used to directly connect the commercial AC power supply to the rechargeable built-in battery 32 (BAT2) incorporated in the accessory 2, and has the charging function for accumulating the electric power in the battery 32. A battery 32a (BAT3) is a replaceable battery. The camera 1 and the accessory 2 may be operated while the charging connection unit 47 is connected.

In case the accessory 2 is connected to the camera 1 and the power supply is available from the second battery 32 (BAT2), the third battery 32a (BAT3) and the charging connection unit 47 (POWER), the second battery 32 (BAT2) or the third battery 32a (BAT3) is preferentially used in the phototaking or reproducing operation regardless of the state of use of the battery 23 (BAT1), and, when the capacity of the second or third battery becomes deficient, an alarm is displayed on the display member and the operation is interrupted.

In FIG. 13, blocks 48, 37 and 49 are respectively a filter set, a conversion lens set and a phototaking direction conversion set.

The filter set 48 contains a UV cut filter, a color conversion filter, a soft focus filter, a color balance adjusting filter etc. in switchable manner, in addition to a plain glass.

The conversion lens set 37 contains a telephoto conversion lens, a wide-angle conversion lens, a close-up conversion lens etc. in switchable manner, in addition to a plain glass. A lens set 51 to be inserted into the finder optical system 50 (cf. FIGS. 27 to 28B) provided in the accessory 2 is also constructed integrally. Thus the phototaking conditions of the camera body 5 and of the flash light 36 can be controlled by the detection of the set state of such conversion lenses.

The phototaking direction conversion set 49 is to place a flat mirror, for deflecting the optical axis, in front of the phototaking lens 11 of the camera body 5. This set, allowing to take an object not present on the optical axis of the phototaking lens, allows to switch the phototaking direction without moving the camera 1 and the accessory 2. Basically there can be obtained a normal image, a vertically inverted image or a laterally inverted image.

It is preferable to detect the state of such phototaking direction conversion and, in the storage of the image data in the memory device 17, 33 or 34, to convert the addresses of data storage corresponding to such normal image, vertically inverted image or laterally inverted image, or to store the data indicating such normal image, vertical inversion or lateral inversion together with the image data.

In the following there will be explained the phototaking operation with the electronic still camera 1 explained above.

When the release switch 19 is actuated by the depression of the shutter release button 12, the light coming from the object and transmitted through the phototaking lens 11 is separated, by unrepresented complementary color filters of the CCD image sensor 15, into yellow (Ye), cyan (Cy), magenta (Mg) and green (G) components, which are converted into electrical signals by the pixels of CCD image sensor 15, respectively corresponding to the Ye, Cy, Mg and G color filters. In this manner color signals Ye, Cy, Mg and G are released from the CCD image sensor 15.

The A/D converter circuit 16 converts these color signals Ye, Cy, Mg, G into digital data.

Then the signal processing circuit (control circuit) 18, composed for example of a DSP (digital signal processor), generates image signals from these digital data. The image signals employed in the present embodiment are a luminance signal Y obtained by color conversion which is one of the processes conducted by the DSP, a color difference signal R-Y obtained by subtracting the luminance signal Y from the red color signal R, and a color difference signal B-Y obtained by subtracting the luminance signal Y from the blue color signal B.

In addition to the color conversion, the signal processing circuit 18 executes, for example, pixel interpolation, horizontal and vertical contour enhancement, and gamma correction. After these processes, the signal processing circuit 18 sends the image signals to the signal compression circuit (not shown).

The image compression circuit once stores the image signals, released from the signal processing circuit, in an unrepresented internal memory, and then applies compression of JPEG (joint photograph ic experts group) format on the image signals.

In the present embodiment, the CCD image sensor 15 employs color filters of complementary colors, but there may also be employed those of primary colors of red (R), green (G) and blue (B). In such case the image signals may be formed by the signal processing circuit 18 from the three primary color signals R, G, B obtained from the CCD image sensor.

When the shutter release button 12 is at first depressed lightly to close so-called half-stroke switch, the CPU of the control circuit 18 so controls the CCD 15, the A/D converter 16, the signal processing circuit and the image compression circuit as to fetch the image signals in a memory of the image compression circuit as explained in the foregoing.

Then, based on the luminance of the image signals prior to the compression, the signal accumulating time of the CCD image sensor 15 is so adjusted as to obtain the image of an optimum brightness.

Then, when the shutter release button 12 is depressed deeper to close so-called full-stroke switch, the CPU causes the image compression circuit to fetch the image signals, with such adjusted signal accumulating time, in the memory thereof. These signals are the normal data fetched in response to the actuation of the shutter release button 12. In such electronic shutter operation for the CCD 15 for reading the signal charges obtained only during the signal accumulating time, the adjustment of the signal accumulating time allows to obtain the image signals of an optimum brightness.

Subsequently the CPU reads the image signals, compressed in the JPEG format, from the image compression circuit, and writes these data in a predetermined area of the memory device 17 in the DOS-FAT (disk operating system/file allocation table) format, so as to be utilizable by a personal computer employing the MS-DOS operating system. In this manner, in response to the depressions of the shutter release button 12, there are repeated recordings of the compressed image signals in the areas of the memory device 17, whereby recorded are image signals of plural images.

After the phototaking operation, the slot fitting portion 5A of the camera body 5 is inserted into the PC card slot 4 of the personal computer 3. Upon insertion, the PC card connector 7 of the camera body 5 is connected to the connector in the PC card slot 4, whereby the camera body 5 is electrically connected to the personal computer 3. Thus the personal computer 3 makes access, through an unrepresented internal PC card interface (PC card controller), to the memory device 17 of the camera body 5, thereby reading the image signals stored in the memory device 17.

In this operation, the PC card interface circuit 22 effects protocol conversion between the memory device 17 and the PC card interface in the personal computer 3, thereby enabling the communication between the memory device 17 and the personal computer 3 (PC card interface). The above-mentioned protocol conversion varies depending on the specification of the PC card interface between the PC card interface circuit 22 and the personal computer 3. For example, if the memory device 17 is a flash memory of ATA (AT attachment) specification, there is executed an ATA-flash memory conversion, and, if it is a flash memory of AIMS (auto indexing mass storage) specification, there is executed an AIMS-flash memory conversion.

The image signals obtained in the electronic still camera 1 can thus be utilized in the personal computer 3.

In the present embodiment, the image signals are compressed by the image compression circuit in the control circuit 18, but, if the number of the image signals to be recorded in the memory device 17 is limited, the image signals without compression may be directly stored in the memory device 17.

In the foregoing description, the personal computer 3 has been explained as the external equipment for reading the image signals, but there may also be employed a PC card drive device having a PC card slot, and, in such case, the data read in such PC card drive device are transferred to the personal computer.

In the embodiment shown in FIG. 13, the PC card interface circuit 22 is used as the interface means for communication with the external equipment, but it is also possible, instead, to use the CPU as the interface means.

In such case the PC card interface circuit 22 is utilized as a bidirectional input/output buffer. Thus, in case of access from the personal computer 3, the connection from the camera to the personal computer 3 is disconnected, and, in case of access from the camera, the connection from the computer to the camera is disconnected.

Then, in response to a command from the computer 3, the CPU reads the image from the memory device 17 and sends the image signals to the computer 3. In such configuration, the protocol conversion may also be conducted in the CPU.

In case an LCD monitor (not shown) is provided in a part of the camera body 5, for example on the surface of the slot fitting portion 4 or the unfitting portion 5, it is conceivable to control whether or not to display the image on such monitor, by detecting the insertion into the slot 4 by the above-mentioned CPU.

In the above-explained embodiment, as shown in FIGS. 10, 11, 12, 14A, 14B, 15A and 15B, the phototaking lens 11 constituting the optical system unit is preferably so positioned as to be exposed on the upper face or one of the lateral faces of the camera body, with the optical axis of the phototaking lens being parallel or perpendicular to the inserting direction of the slot fitting portion 5A of the camera body 5 into the external device (personal computer 3). Such three manners of positioning are indicated by broken lines 11, 11A, 11B in FIGS. 14A and 14B. Also the position of the shutter release button 12 may be changed to 12A, depending on the position of such phototaking lens.

For example, if the optical axis of the phototaking lens 11 constituting the optical system unit is so positioned as to be perpendicular to the top and rear faces of the camera body 5, or as to be exposed on a lateral face thereon, perpendicularly to the inserting direction of the slot fitting portion 5A into the external equipment, there can be reduced the possibility of touching the optical element with the finger at the inserting operation of the camera body 5 into the slot 4 of the external equipment. As the probability of smear or breakage of the optical element can thus be avoided, it is rendered easier to employ a structure of directly inserting the camera body 5 into the slot of the external equipment.

Naturally the optical axis of the phototaking lens 11 may be exposed on an end face of the camera body 5, parallel to the inserting direction of the slot fitting portion 5A thereof into the external equipment. In such case the camera can be made compacter, lighter and thinner, and it is rendered easier to employ a structure of forming the entire camera body as a flat plate-shaped slot fitting portion, to be accommodated in the slot of the external equipment.

Figure 18:
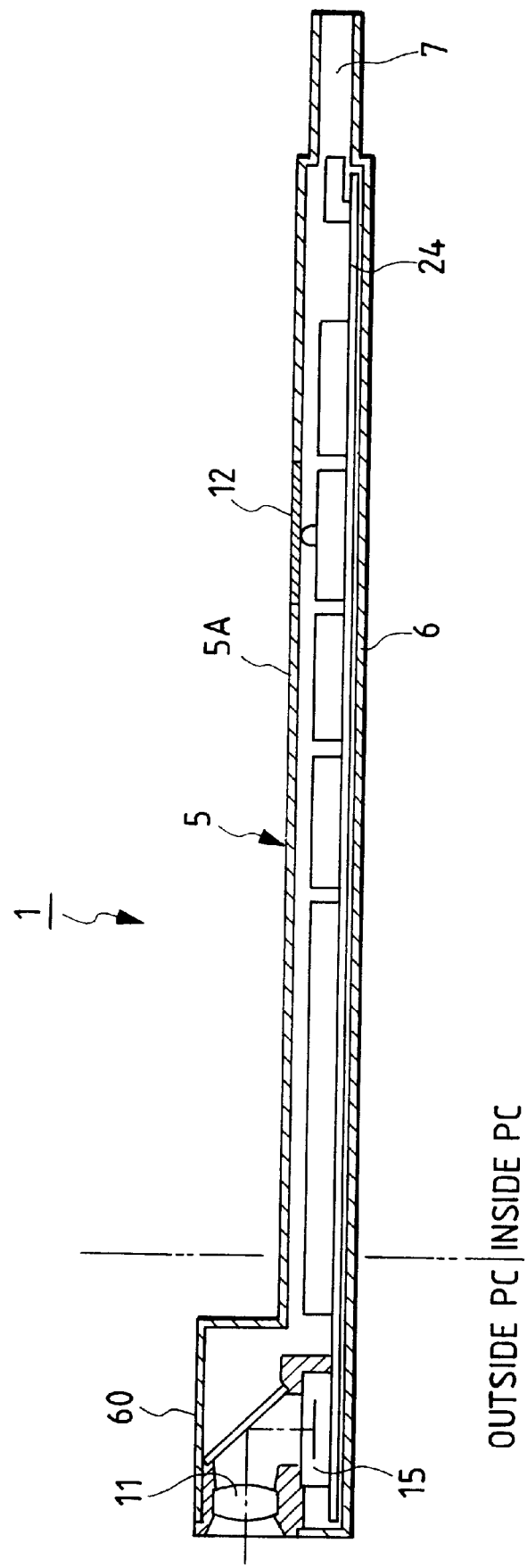
FIG. 18 is a schematic cross-sectional view of the electronic still camera shown in FIG. 17.

FIGS. 17 and 18 illustrate another embodiment of the electronic still camera of the present invention, wherein the camera body 5 is composed of the above-mentioned slot fitting portion SA and an integral unfitting portion 60, which protrudes externally at the insertion into the slot 4. In such case, the unfitting portion 60 is formed thicker than the slot fitting portion 5A.

The unfitting portion 60 is provided therein with an optical system unit composed of the phototaking lens 11 and the image sensor 15, and a display panel 61 for displaying various information.

As explained in the foregoing, the camera body 5 may be entirely composed of the slot fitting portion 5A of a flat plate shape which can be entirely accommodated in the PC card slot 4 of the external equipment, or be composed of the slot fitting portion 5A and the unfitting portion 60 which protrudes externally at the insertion into the slot 4. Also such unfitting portion 60 may be formed as a flat plate shape continued from the slot fitting portion 5A or formed thicker, protruding to the front and/or rear surface of the slot fitting portion 5A as shown in FIGS. 17 and 18.

In case the unfitting portion 60 is formed thicker, the slot fitting portion 5A need not be limited to the aforementioned type III of the PC card standard but can also be formed according to the type I or II.

In case the camera body 5 has the unfitting portion 60, the optical system unit is preferably incorporated therein. Particularly in case such unfitting portion 60 has a certain thickness, there can be efficiently incorporated the optical system unit consisting of the phototaking lens 11 and the image sensor 15 and requiring a relatively large space, also the battery (not shown) and the display panel 61, whereby the camera can be made compacter and lighter.

In the above-explained configuration, the shutter release button 12 and the operation buttons 13 are preferably provided on the slot fitting portion 5A, so as to inhibit the operations thereof in the inserted state in the slot 4. However it is also possible to provide the shutter release button 12 on the unfitting portion 60, so as to enable the phototaking operation even during the inserted state into the computer 3.

FIGS. 19A, 19B, 20A, 20B and 21A, 21B, 22A, 22B illustrate still other embodiments of the present invention.

Figure 19A:
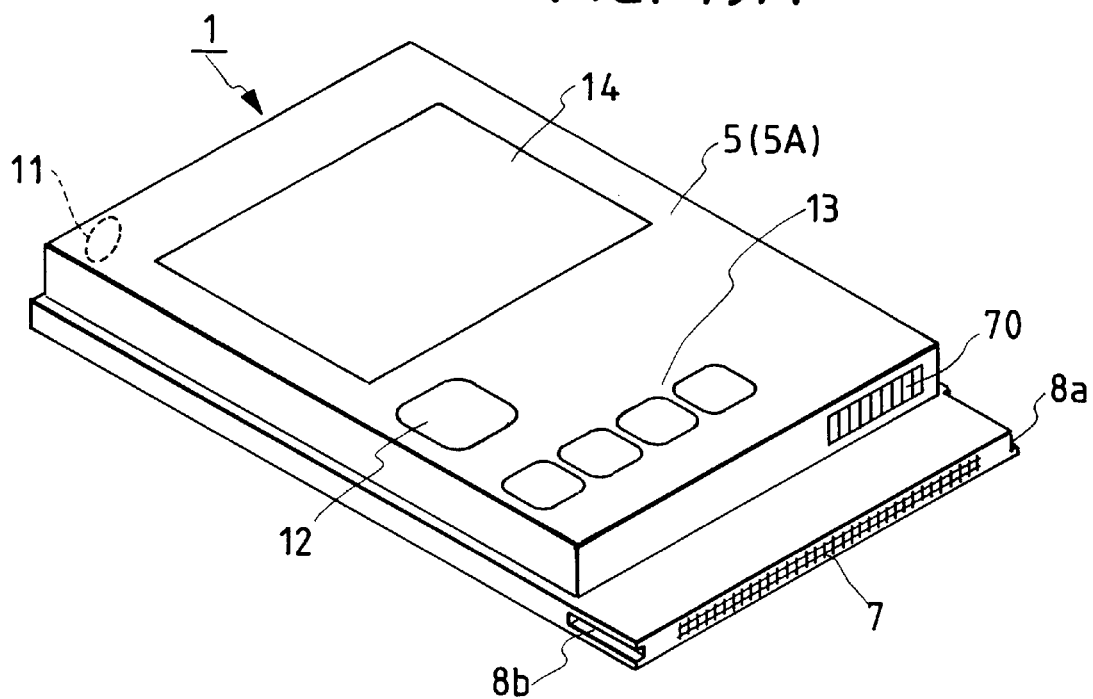
FIGS. 19A and 19B are perspective views, seen from diagonally above, of another embodiment of the electronic still camera of the present invention.
Figure 19B:
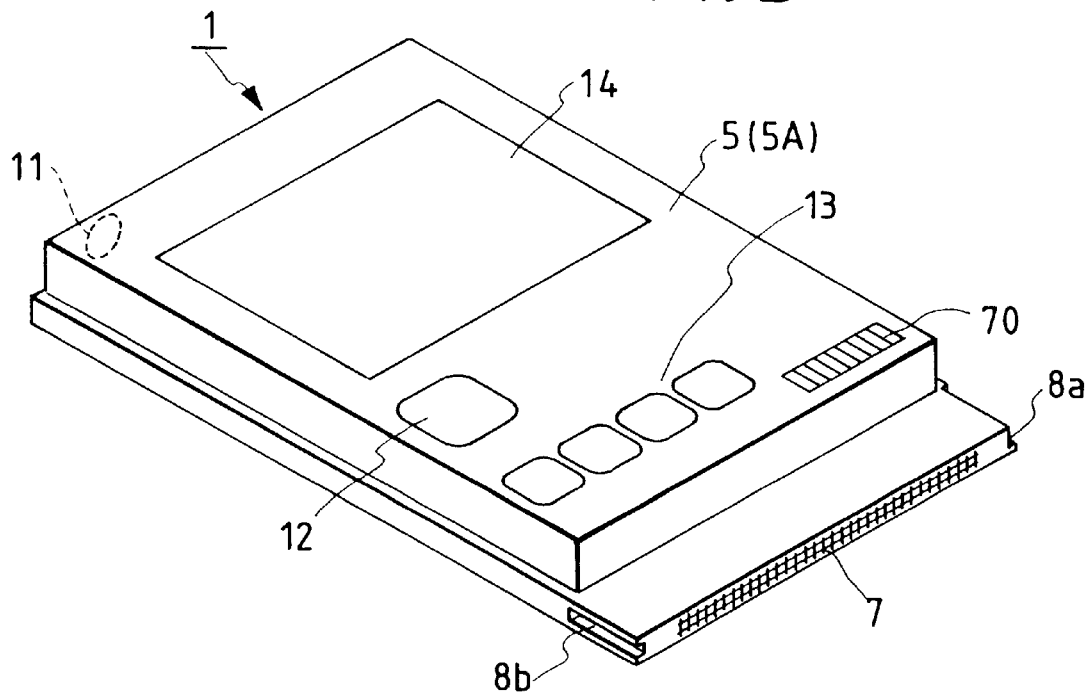
Figure 20A:
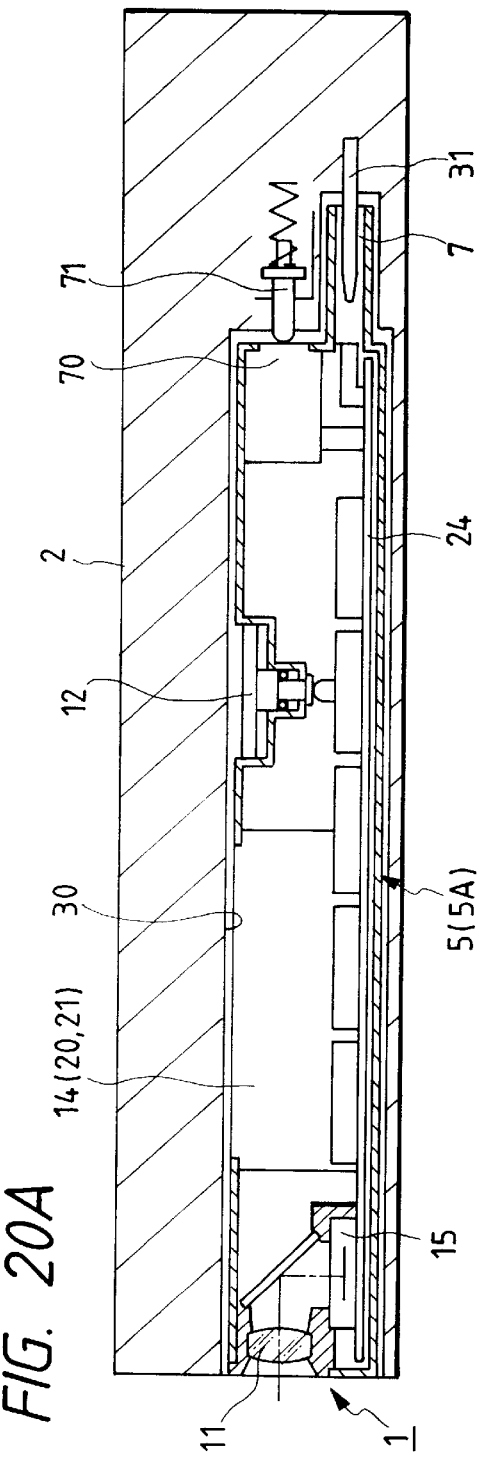
FIGS. 20A and 20B are schematic cross-sectional views of the electronic still camera shown in FIGS. 19A and 19B, in a combined state with the camera accessory.
Figure 20B:
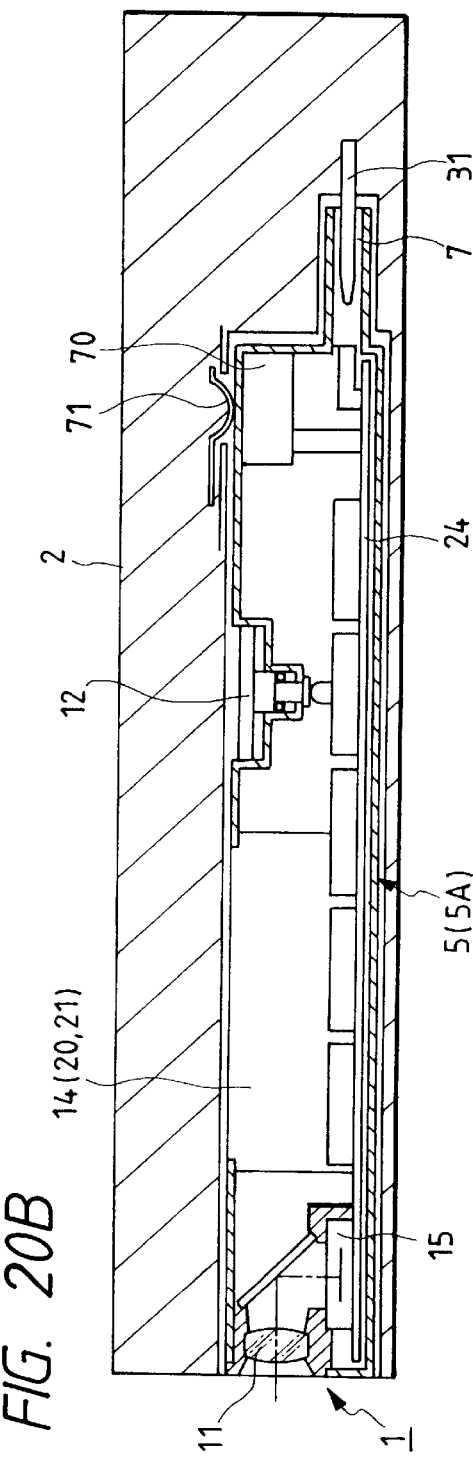

In these embodiments, the slot fitting portion 5A of the camera body 5 is provided with a PC card connector 7 for connection with a connector in the PC card slot 4 of the external device when inserted into such PC card slot 4, and is further provided with a second connector 70 in another or adjacent position on the slot fitting portion 5A, for example in an end face of a stepped portion close to the connector 7 in case of FIG. 19A, or on the upper face close to a stepped portion close to the connector 7 in case of FIG. 19B, and the camera accessory 2 is provided with a second connector 73 for connection with the above-mentioned second connector 70. In case of FIG. 21A, the second connector 70 is provided on an internal stepped face of the unfitting portion 60 connected to the slot fitting portion 5A, and, in case of FIG. 21B, it is provided in a position equivalent to that in FIG. 19B.

In such configuration, when the camera accessory is mounted on the camera body, the first connector 31 may be used for the signals relating to the image memory control, while the second connector 73 may be used for the signals relating to the phototaking operations of the camera 1.

Figure 23:
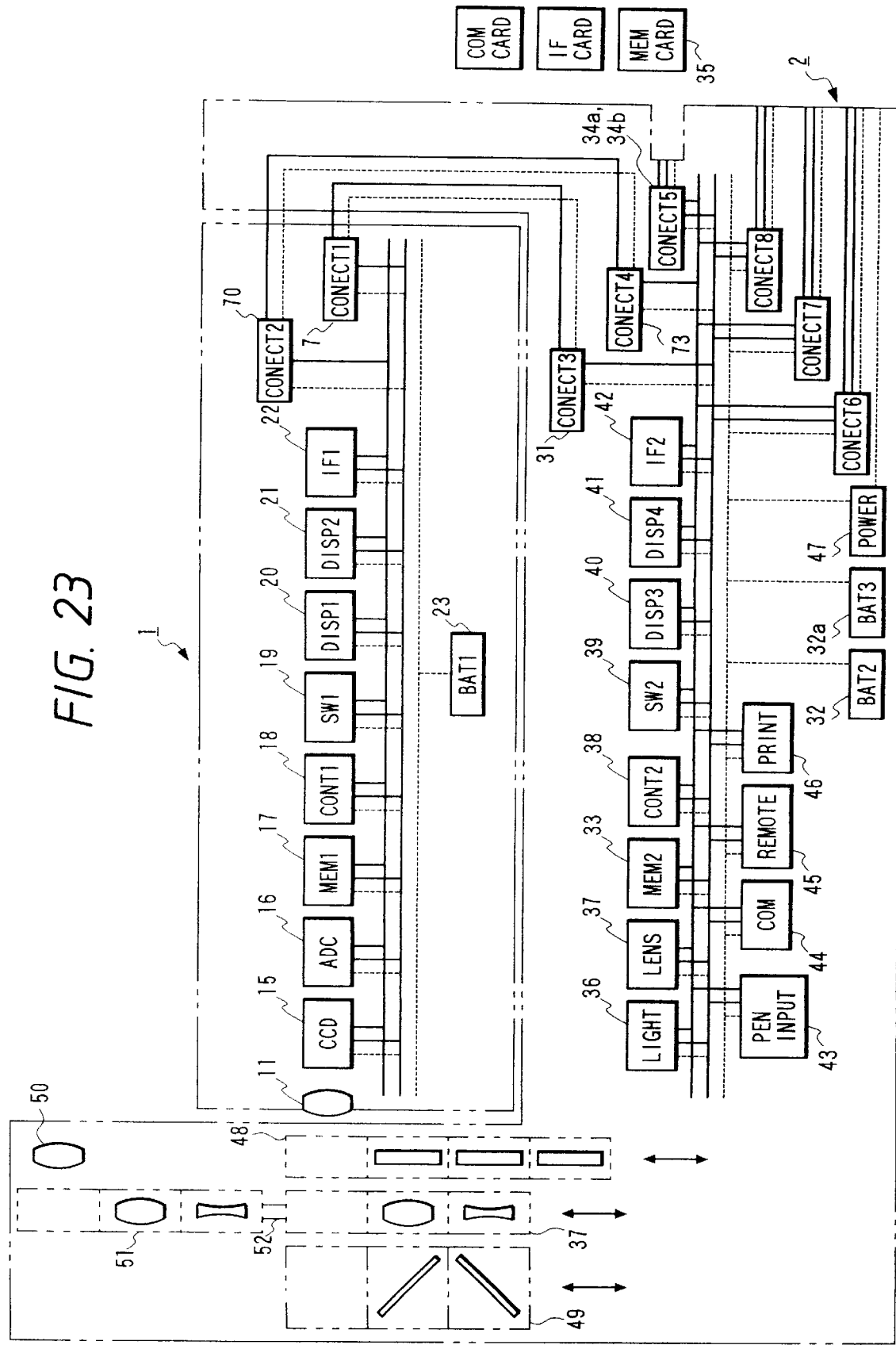
FIG. 23 is a block diagram of the electronic still camera shown in FIGS. 20A, 20B, 22A and 22B, in a combined state with the camera accessory.

FIG. 23 is a block diagram, similar to that in FIG. 13, in case the slot fitting portion 5A of the camera body 5 is provided with the first and second connectors 7, 70 as explained above, in combination with the corresponding connectors 31, 73. The block diagram will not be explained further as it is same as FIG. 13 except for the presence of the second connectors 70, 73.

FIG. 24 shows another embodiment in case the camera 1 having the above-mentioned second connector 70 is combined with the accessory 2, wherein shown are hook members 80 provided on the accessory 2 and hook holes 81 provided in a stepped portion of the unfitting portion 60 of the camera body 5. The hook members 80 are so constructed as to be unlocked by the actuation of an unlocking button provided on the accessory 2.

The above-explained configuration is provided to ensure mechanical coupling of the camera 1 and the accessory 2 at the connection thereof. Such ensured mechanical coupling avoids unexpected disconnection of the electrical coupling.

In FIG. 24, the accessory 2 is provided with operation buttons 39a.

Figure 26A:
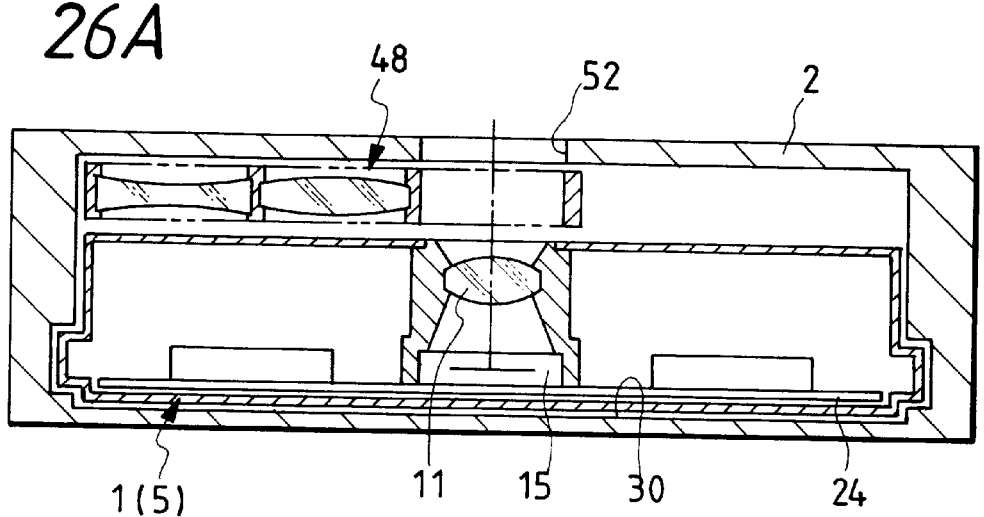
FIGS. 26A and 26B are cross-sectional views of an optical system unit including a phototaking lens and an image pickup device, in the electronic still camera and the camera accessory shown in FIG. 25, in a mutually combined state.
Figure 26B:
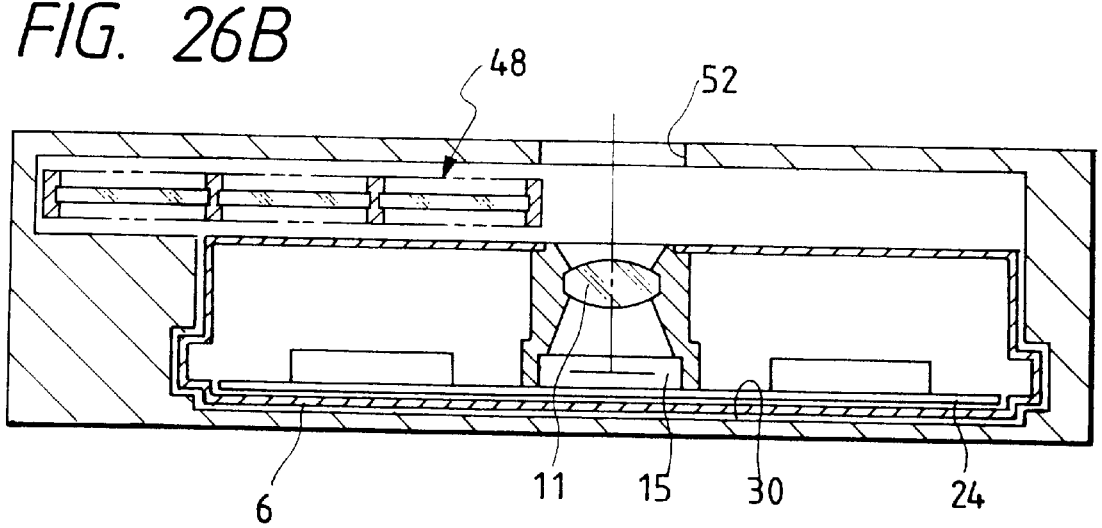

FIGS. 25 to 26B illustrate another embodiment of the present invention, wherein the accessory 2 is provided with an aperture 52, in a position corresponding to the phototaking lens 11 provided on the slot fitting portion 5A of the camera 1. The accessory 2 incorporates therein the conversion lens set 37 or the filter set 48 mentioned in the foregoing.

In case of adopting the dimension of the type III, the optical system can be incorporated in the transversal direction, and, in such case, the accessory 2 can be provided with the aperture 52 and the conversion lens set 37 or the filter set 48 can be so provided as to fit on the aperture 52 and is selectively operable by the sliding motion of an operation knob 55.

In this manner the phototaking operation may be made with a telephoto, wide-angle or close-up lens in the conversion lens set 37, or with a UV-cut, color conversion, soft focus or color balance adjustment filter in the filter set 48. A sliding motion of the operation knob 55, for shifting such conversion lens set 37 or the filter set 48, allows to place a suitable lens or a filter in front of the phototaking lens 11.

FIG. 26A shows a case of switching the conversion lens set 37, and FIG. 26B shows a case of switching the filter set 48.

Operation members 39a for setting the phototaking conditions, a shutter release button 39 and display members 40, 41 are provided on the external surface of the accessory 2, in order to enable various operations even when the camera 1 is fitted in the accessory 2. In response to the detection of the fitting of the camera 1 into the accessory 2, the inputs by the operation members of the camera 1 hidden in the accessory 2 are disabled, and the inputs on the accessory 2 are enabled. Similarly the display member 14 (20, 21) on the camera are disabled and those 40, 41 on the accessory 2 are enabled.

Figure 28A:
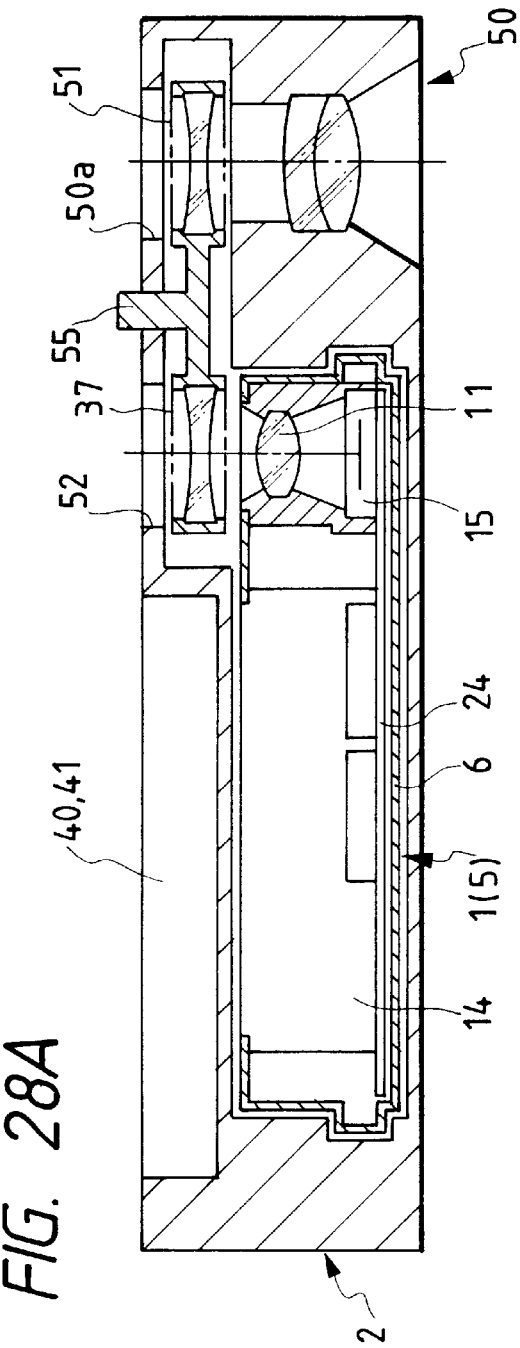
FIGS. 28A and 28B are cross-sectional views of an optical system unit including a phototaking lens and an image pickup device and a view finder unit, in the electronic still camera and the camera accessory shown in FIG. 27, in a mutually combined state.
Figure 28B:
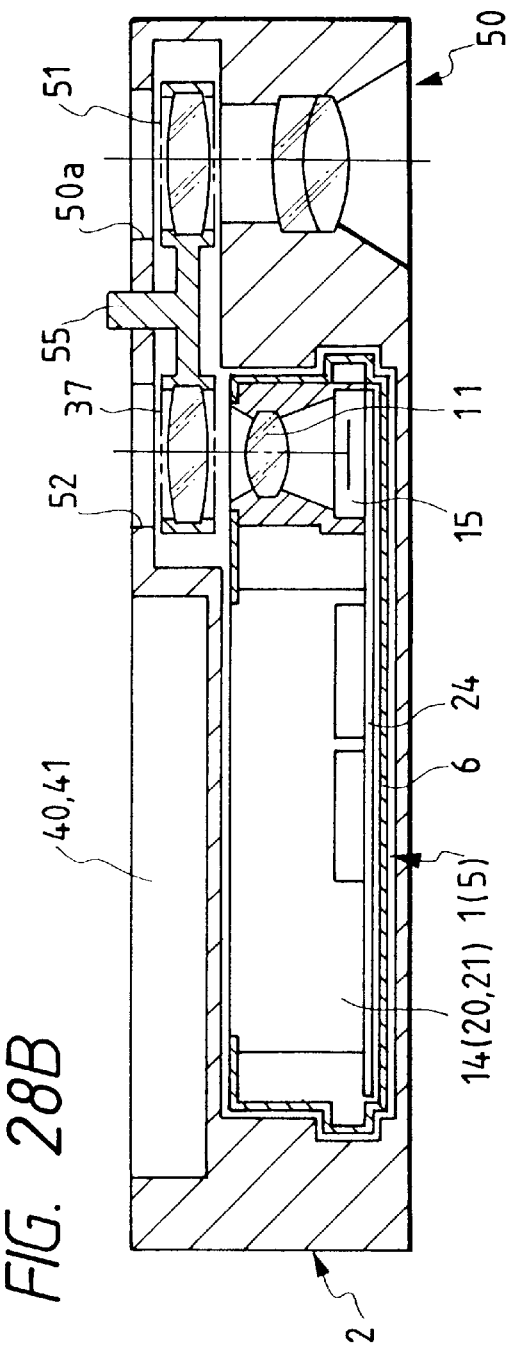

In the foregoing, the lenses or filters are assumed to be switched by a sliding motion, but they may also be positioned on a disk which is rotatable about a fixed shaft. FIGS. 27, 28A and 28B illustrate still another embodiment, in which the accessory 2 is provided with a flash emission unit 36, generally called strobe light.

Also the accessory 2 is provided with an optical view finder 50, in a position different from the inserting portion 30 for the camera 1.

A view finder window 50a is formed as an aperture on the accessory 2, and is provided therein with a lens constituting a finder optical system. A lens 51, for varying the image angle of the view finder when placed in front of the view finder optical system 50, is provided shiftable by an operation member 55 for the aforementioned conversion lens set 37.

The operator can thus confirm the imaging field as the image angle of the view finder 50 is switched simultaneously with the conversion lens 37 for phototaking.

A part of the accessory 2, containing the flash emission unit 36, is formed larger, and the flash emission unit 36 is so formed as to protrude from the surrounding portion. Such enlarged portion is provided with the shutter release button 39 and the setting members 39a, so as to be usable as the grip portion at the phototaking operation. Also as explained in the foregoing, the setting members for the phototaking conditions, the shutter release button and the display members may be provided on the surface of the accessory 2 when the camera 1 is mounted therein, and the switching of the lenses or the filters may be achieved not only in a sliding motion but by a rotary motion of a disk on which such lenses or filters are provided.

Also the light emission amount of the flash device is rendered controllable by the detection, by means of an unrepresented switch, of the selected position of the conversion lens set 37. As an example, the light emission amount at the close-up phototaking is adjusted to 30% of that at the normal phototaking without the conversion lens, thereby avoiding excessive exposure.

Figure 29:
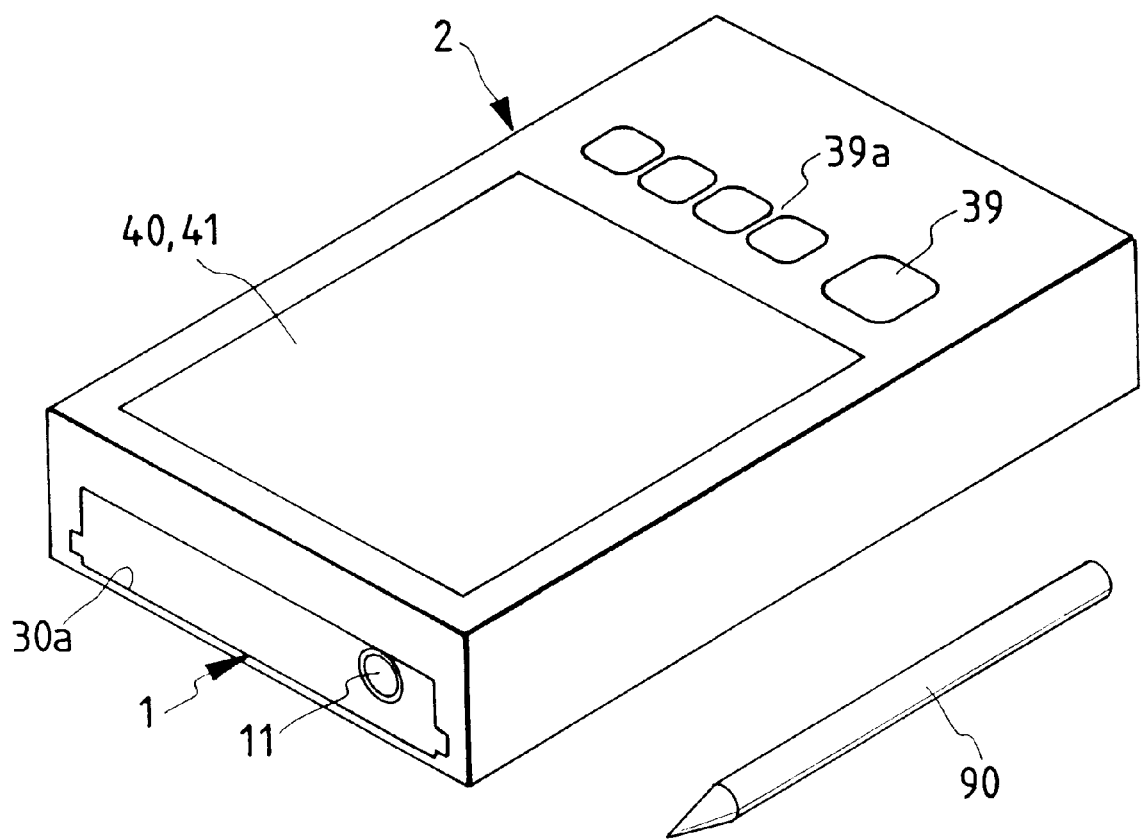
FIG. 29 is a perspective view showing another embodiment of the electronic still camera of the present invention, in a combined state with the camera accessory.

FIG. 29 shows another embodiment in which, in the fitted state of the camera 1 in the accessory 2, an input operation can be made with a pen 90 on the display members 40, 41 provided on the surface of the accessory 2. The display members 40, 41 have a relatively large display area and are positioned close to the operation members 39a for setting the phototaking conditions and the shutter release button 39, and such operation member and display members are switched in response to the detection of connection of the camera 1.

The image taken by the actuation of the shutter release button 39 is stored in the memory device 17, 33 or 34 and is displayed on the display members 40, 41 In this state, a pen input is enabled by selecting a pen input mode with a suitable operation member. More specifically, a line image can be entered by dragging the tip of the pen on the displayed image. Such entered line image is stored in a hierarchic layer different from that of the image data. The image data and the line image data may be stored together. It is also possible to display the stored data (image data and line image data) on the display members 40, 41 and to edit the line image only. Also the circuit may be so constructed as to allow such editing operation when the camera 1 is not fitted.

FIG. 30 shows another embodiment in which the accessory 2 is provided with a modular jack 92 connectable for example to a telephone line for communication or image transmission, or with a general-purpose interface 91 such SCSI or GPIB, for enabling data exchange with the outside, for example with a computer.

The memory devices 33, 34 of the accessory 2 may be used for such signal exchange even when the camera 1 is not fitted.

Figure 31:
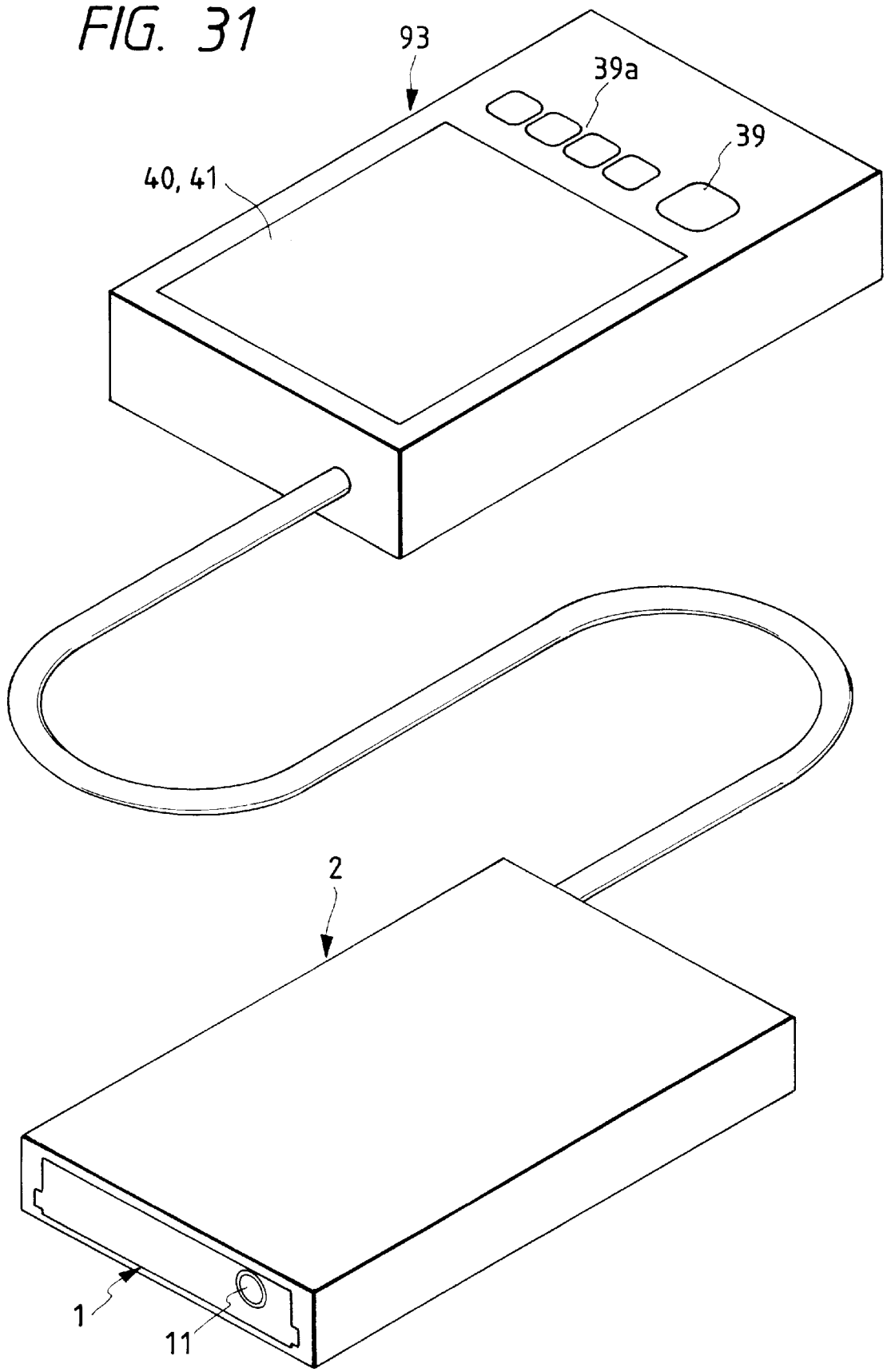
Figure 32A:
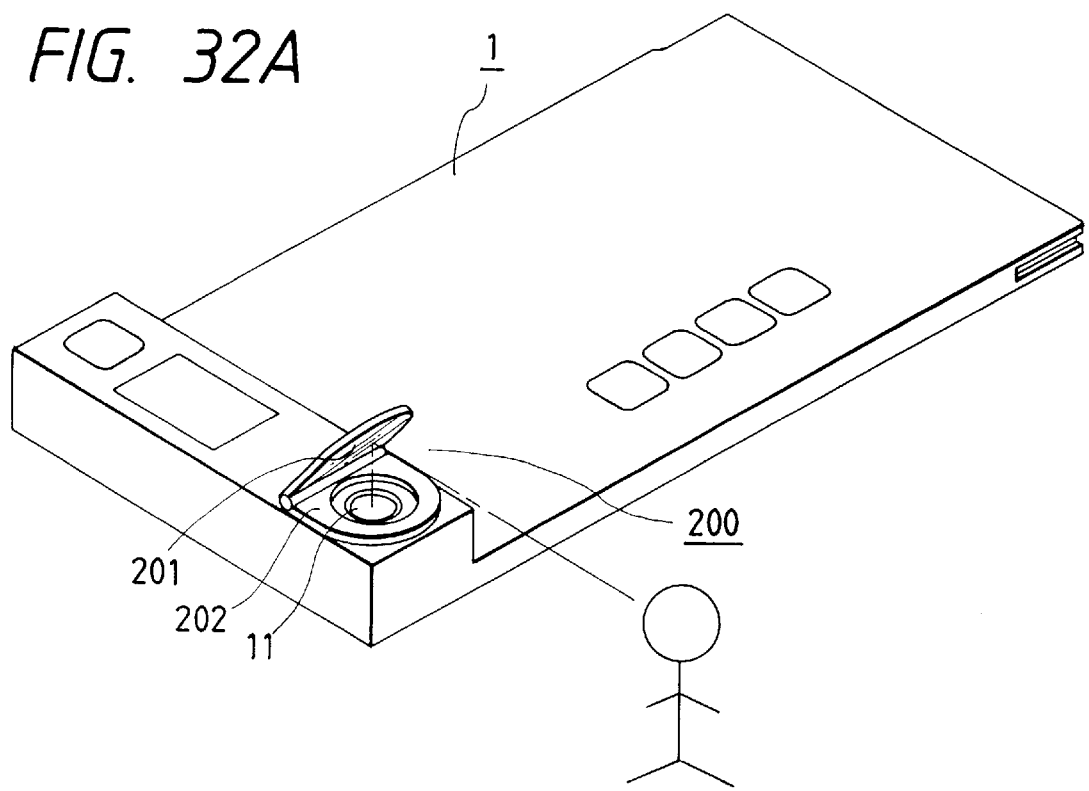
FIGS. 32A to 32D are perspective views of still another embodiment of the electronic still camera of the present invention.
Figure 32B:
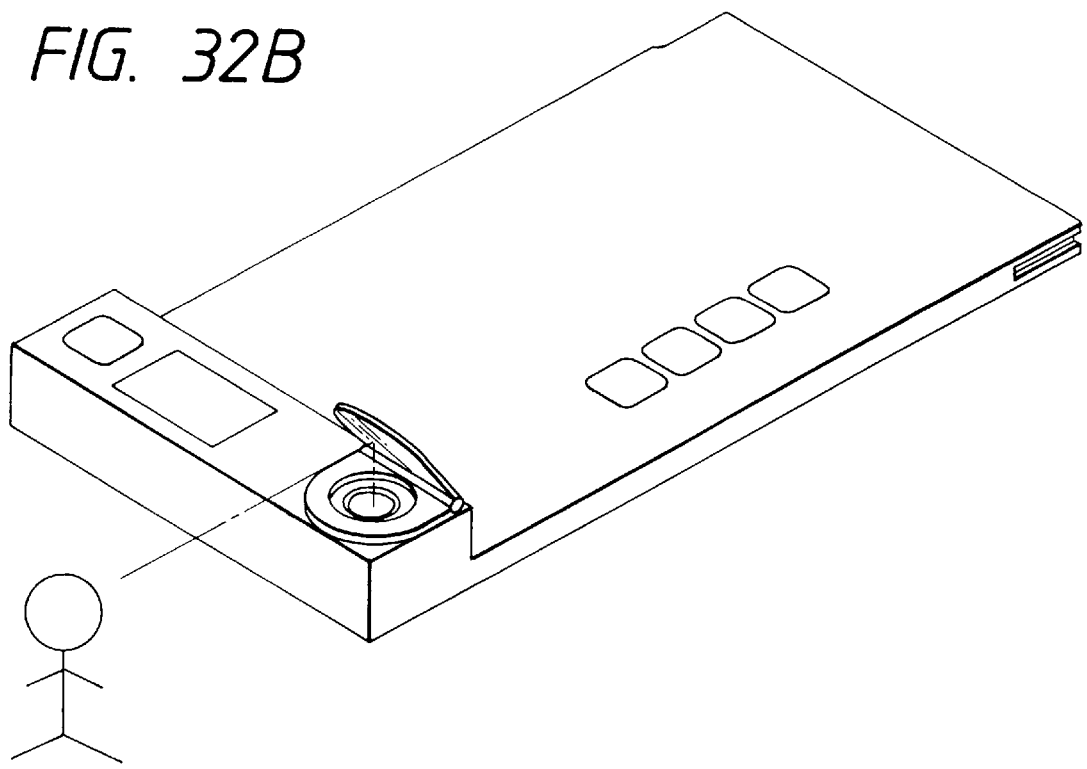
Figure 32C:
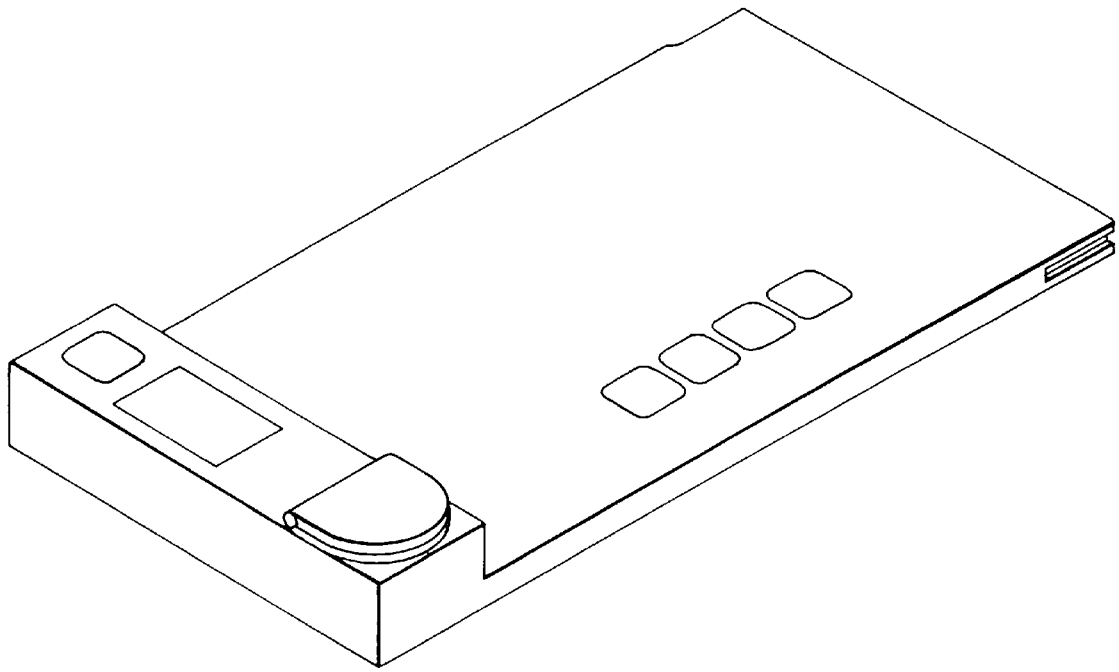
Figure 32D:
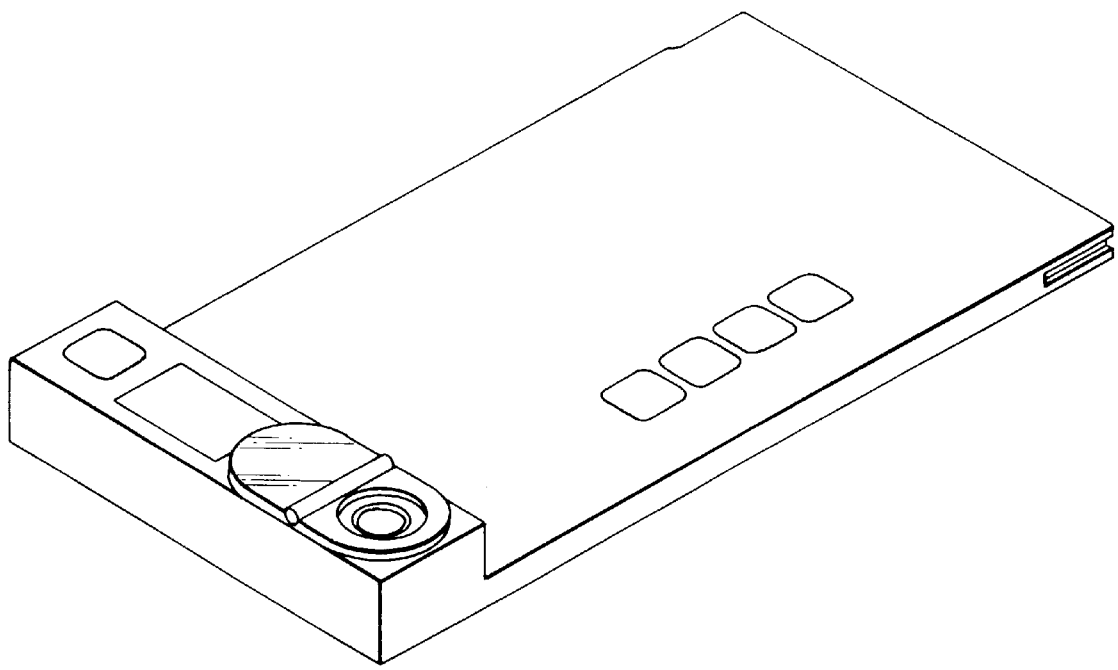

FIG. 31 shows a configuration in which the functions of the accessory 2, shown in FIGS. 25, 27, 29 and 30 are provided in a remote controller 93, which is connected by a cable with the accessory 2 in which the camera 1 is fitted.

In such configuration, by providing the remote controller 93 with the operation members 39a for setting the phototaking conditions, the shutter release button 39 and the display members 40, 41 and by fixing the accessory 2 together with the camera 1 in a desired phototaking direction in a remote location, there can be achieved a desired phototaking operation by the operation on such remote controller 93. Since the image can be monitored at the phototaking operation, it is rendered possible to effect the phototaking and storage operation when necessary, and store the necessary image data only in the memory devices 17, 33, 34.

In the following there will be explained still another embodiment, with reference to FIGS. 32A to 32D and 33.

FIGS. 32A to 32D show states where a phototaking direction conversion set 200 is mounted on the camera body, which is equivalent to that shown in FIG. 15A and will not, therefore, be explained further.

The phototaking direction conversion set 200 is provided with a foldable flat mirror 201, and a rotating portion 202 capable of rotary motion about the optical axis of the phototaking lens 11.

In contrast to the phototaking direction conversion set 49 shown in FIG. 13, which is usable when the camera is not inserted into the slot of the personal computer but singly effects the phototaking operation, the phototaking direction conversion set 200 mentioned above can be used even when the camera is inserted in the slot of the personal computer.

The flat mirror 201 of the conversion set 200 can be maintained, by means of a known holding mechanism and a known detection mechanism (detecting circuit 210), in a closed state (FIG. 32C), a 45° open state (FIG. 32A or 32B) or a more than 90° open state (FIG. 32D), with the detection of such state. In the closed state of the flat mirror 201, the phototaking direction conversion set 200 is used as the protective cover of the phototaking lens 11. It can also be maintained in a position which is open more than 90°, in order to directly take an object, without reflection on the mirror, even when the conversion set 200 is mounted.

The rotary state of the rotary portion 202 of the conversion set 200 about the optical axis can be detected by the detecting circuit 210.

Figure 33:
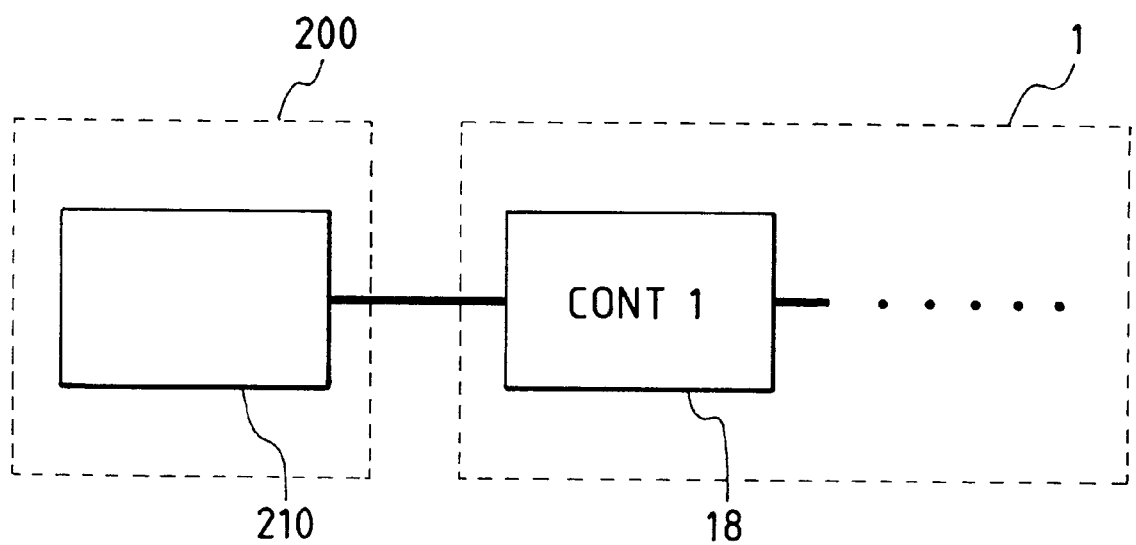
FIG. 33 is a schematic block diagram of such embodiment.

Now reference is made to FIG. 33 for explaining the electrical connection.

The detection circuit 210 is provided in the phototaking direction conversion set 200, and is electrically connected to the control circuit 18 (CONT1) in the camera body shown in FIG. 13. The control circuit 18 (CONT1) effects various controls in response to the output of the detection circuit 210.

For example, the control circuit 18 (CONT1) turns off the power supply relating to the phototaking operation, when the detection circuit 210 detects that the flat mirror 201 is closed.

In case the detection circuit 210 detects that the mirror is at 45°, the control circuit 18 (CONT1) causes the detection circuit 210 to detect the rotary angle of the rotary portion 202 and processes the image data obtained from the image sensor, so as to obtain proper image data according to the rotary angle of the rotary portion 202.

In case the detection circuit 210 detects that the mirror is open more than 900, the control circuit 18 (CONT1) effects normal image processing, regardless of the rotary angle of the rotary portion 202.

The present invention is not limited to the configurations shown in the foregoing embodiments, but is naturally subject to variation or modification of the form and the structure of various constituent units.

For example, the connector provided in the insertion unit 30 of the accessory 2, for connection with the connector 7 of the slot fitting portion 5A of the camera 1, is composed of a pin-jack type, but it is not limited to such structure and can be of any widely known type.

Also the shutter release button 12 is not limited to the common button-switch structure, but, as shown in FIGS. 22A and 22B, it can also have an elastic sheet-shaped member, formed in a part of the case 6, for use as the switching button.

According to the present invention, the accessory 2 is formed into a substantially box-like shape, and the camera 1 is used in a state in which the slot fitting portion 5A is inserted into the inserting unit 30 formed in a part of such accessory 2. Consequently the accessory 2 can have the function of protecting the electronic still camera of the PC card type, and can also facilitate the gripping at the phototaking operation.

Also the conversion, in the signal processing unit of the control circuit 18, from the output signal of the image pickup device 11 into the image signal, need not necessarily be conducted in the digital form but can also be conducted in the analog form.

The CCD 14, constituting the image pickup device, is for example of a size of 8×8 mm, with about 250,000 pixels.

In the foregoing embodiments, the external equipment is composed for example of a notebook-sized personal computer 3, and the slot for the card-shaped recording medium is composed for example of a PC card slot 4, and the signals are processed in the digital form.

Also the camera accessory 2 is so constructed as to have a thin rectangular parallelopiped form with the inserting portion 30 for accepting the slot fitting portion 5A of the electronic still camera 1.

The electronic still camera of the present invention, as explained in the foregoing, comprising a camera body provided with a slot fitting portion which can be fitted in a PC card slot of an external equipment and which is provided with a connector of the PC card side for connection with a connector of the PC card slot side when the slot fitting portion is inserted into the PC card slot of the external equipment, and a camera accessory mountable on the camera body and provided with a connector for connection with the connector of the PC card side, provides the following excellent effects despite of the simple configuration.

According to the present invention, the camera body or a part thereof is formed with a shape of the PC card of the card-shaped recording medium, thereby providing a slot fitting portion which can be directly inserted into the PC card slot for example of the personal computer, whereby the camera can singly perform the phototaking operation and the exchange of the image signal with the external equipment can be achieved by direct insertion of the slot fitting portion into the PC card slot of the external equipment such as a personal computer or a PC card drive unit connected to the personal computer. Also the camera accessory can be attached when required, to effect the phototaking operation, reproduction of the recorded image and signal exchange.

In addition, according to the present invention, camera accessories with various functions can be selectively combined with the above-explained electronic still camera, utilizing the connector of the slot fitting portion thereof, thereby fully exploiting the functions of the camera.

Such camera accessories include, for example, a battery pack containing a main battery or an expansion battery, a memory pack containing a main or sub memory device, a flash emission unit of an electronic flash device which is generally called a strobe light, a remote terminal for remote control operations, a view finder unit, a lens adapter such as a lens filter, an externally attached conversion lens or a light regulating lens, and a liquid crystal display device for displaying the object field as a view finder, displaying the recorded image for the purpose of confirmation or reproduction, and displaying the conditions of phototaking operation and the remaining capacity of the battery or the memory device. The accessory may further be provided with a simple view finder, and with a portion functioning as a holding grip in the phototaking operation.

Furthermore, according to the present invention, the configuration of attaching such camera accessory provides an advantage of constructing the camera body with the minimum necessary parts, in compact, light-weight, thin and inexpensive manner.

More specifically, according to the present invention, the camera body having the slot fitting portion which is insertable into the PC card slot of the external equipment is provided with an optical system unit including a phototaking lens and an image pickup device for converting the optical information from the object into the electrical signals, a memory device for storing the image signal obtained from the output signal of the image pickup device, a PC card connector for connection with the connector in the PC card slot of the external equipment, and a battery for power supply.

Also according to the present invention, the camera accessory may be provided with mechanisms, operation units and display units required for the camera, thereby enabling the phototaking operation in a simple manner when it is combined with the camera body.

What is claimed is:

1. An electronic still camera for transferring image signals into a card slot of an external device, comprising:

a camera body, having a phototaking lens and a card slot fitting portion, the card slot fitting portion being insertable into the card slot of the external device;

a cover member in which said card slot fitting portion of the camera body is detachably inserted;

an image pickup device to convert optical information into an electrical output signal;

a memory device to store the electrical output signal of the image pickup device;

an interface device to effect communication between the external device and said memory device upon insertion of said card slot fitting portion into the card slot of said external device; and a card connector for connection with said card slot, wherein the camera is operable when the card slot fitting portion is not inserted into the external device, and the phototaking lens extends outside the external device or the cover member when the card slot fitting portion is inserted in the external device or the cover member.

2. An electronic still camera according to claim 1, wherein said cover member further comprises a shutter release button; a power source; and a connector to connect the power source and the card connector of the camera body.

3. An electronic still camera according to claim 2, wherein said cover member further comprises an electronic flash device; and an electronic flash controlling circuit.

4. An electronic still camera according to claim 3, wherein said cover member further comprises a grip portion.

5. An electronic still camera for transferring image signals into a PC card slot of an external device, comprising:

a camera body, having a PC card slot fitting portion, which is insertable into the PC card slot of the external device;

an image pickup device to convert optical information into an electrical output signal;

a memory device for to store the electrical output signal of the image pickup device;

a PC card interface circuit to effect communication between the external device and said memory device upon insertion of said PC card slot fitting portion into the PC card slot of said external device;

a PC card connector for connection with said PC card slot; and a battery case containing a power source, wherein said PC card connector is detachably connected to the battery case.

6. An electronic still camera according to claim 1, further comprising a mask member for covering an image pickup face.

7. An electronic still camera for transferring image signals to a recording medium slot of an external device, comprising:

a camera body, having a slot fitting portions which is insertable into the recording medium slot of the external device, a connector for connection with the recording medium slot upon insertion of said slot fitting portion into the recording medium slot; and a camera accessory mountable on said camera body, having a first connector for connection with said recording medium slot.

8. An electronic still camera according to claim 7, wherein said camera body further comprises:

an optical system unit, having a phototaking lens and an image pickup device, to convert light into an electrical output signal;

a signal processing unit to convert the electrical output signal of said image pickup device into an image signal;

a first memory device to store the image signal from said signal processing unit;

a switch to activate said image pickup device and said signal processing unit; and a battery to power said image pickup device, said signal processing unit and said memory device.

9. An electronic still camera according to claim 8, said camera accessory further comprising:

a second battery for power supply to the image pickup device and the signal processing unit provided in the camera body, wherein said second battery is used when said camera accessory is mounted on said camera body.

10. An electronic still camera according to claim 8, said camera accessory further comprising a second memory device to store the image signal from the signal processing, wherein the first and second memory device are used when said camera accessory is mounted on said camera body.

11. An electronic still camera according to claim 10, wherein the second memory device is used when the image signal is large, and the first memory device is used when the image signal is small.

12. An electronic still camera according to claim 7, further comprising:

a second connector on said slot fitting portion; and a second connector on said camera accessory to connect with the second connector on said slot fitting portion.

13. An electronic still camera according to claim 12, wherein, when the camera accessory is mounted on the camera body, signals relating to image storage control are transmitted by said first connector of said camera accessory and signals relating to phototaking operations are transmitted by said second connector of said camera accessory.

14. An electronic still camera according to claim 7, wherein the camera accessory selectively includes a shutter release button, a display panel, an electronic flash device and an optical view finder device to be used upon mounting on the camera body.

15. An electronic still camera according to claim 7, wherein the camera accessory has a substantially in box shape, and an end, and further comprises an insertion aperture positioned at the end for inserting the slot fitting portion of the camera body.

16. An electronic still camera for transferring an object image of an object to a recording medium slot, having a protruding portion, of an external device, comprising:

a slot fitting portion insertable into the recording medium slot of the external device;

a connector in said slot fitting portion, for connection with the recording medium slot upon insertion of said slot fitting portion into said recording medium slot;

a phototaking lens, having an optical axis, in said protruding portion to enter the object image; and an optical axis changing unit between said phototaking lens and the object, for changing the optical axis to a predetermined direction.

17. A electronic still camera according to claim 16, wherein said optical axis changing unit further comprises a flat mirror to change the optical axis direction.

18. An electronic still camera according to claim 17, wherein said optical axis changing unit further comprises a rotary portion rotatable about the optical axis of said phototaking lens, wherein said flat mirror is connected to said rotary portion rotates with said rotary portion.

19. An electronic still camera for directly transferring image signals into a card slot of an external device, comprising:

a camera body, having a phototaking lens and a card slot fitting portion, the card slot fitting portion being insertable into the card slot of the external device; and a cover member in which said card slot fitting portion of the camera body is detachably inserted, wherein the camera is operable when the card slot fitting portion is not inserted into the external device, and the phototaking lens extends outside the external device or the cover member when the card slot fitting portion is inserted in the external device or the cover member.

* * * * *

UNITED STATES PATENT AND TRADEMARK OFFICE
CERTIFICATE OF CORRECTION

PATENT NO.:     5,917,545
DATED      :    June 29, 1999
INVENTOR(S):    Yousuke Kowno, et al.

It is certified that error appears in the above-identified patent and that said Letters Patent is hereby corrected as shown below:

Column 26, line 1, (claim 7), change "portions" to --portion,--;
line 34, (claim 10), after "processing" insert --unit--;
line 59, (claim 15), change "in" to --thin,--.

Signed and Sealed this

Twelfth Day of October, 1999

Attest:

Attesting Officer

Q. TODD DICKINSON

Acting Commissioner of Patents and Trademarks